United States Patent [19]
Hoel et al.

[11] Patent Number: 4,942,541
[45] Date of Patent: Jul. 17, 1990

[54] PATCHIFICATION SYSTEM

[75] Inventors: Jeffrey H. Hoel, Los Altos; Eduardo D. Martinez, Mountain View; Jacobo Valdes, Palo Alto, all of Calif.

[73] Assignee: Oms, Inc., Mobile, Ala.

[21] Appl. No.: 147,260

[22] Filed: Jan. 22, 1988

[51] Int. Cl.⁵ .............................. G06F 3/12
[52] U.S. Cl. ...................................... 364/519
[58] Field of Search ........ 364/518, 519, 200 MS File, 364/900 MS File; 340/798, 799

[56] References Cited

U.S. PATENT DOCUMENTS

| | | | |
|---|---|---|---|
| 3,973,245 | 8/1976 | Belser | 364/200 |
| 4,031,519 | 6/1977 | Findley | 364/900 |
| 4,218,754 | 8/1980 | Schaeffer | 364/900 |
| 4,359,286 | 11/1982 | Barnes et al. | 364/519 X |
| 4,594,587 | 6/1986 | Chandler et al. | 340/750 |
| 4,633,430 | 12/1986 | Cooper | 364/900 |
| 4,660,998 | 4/1987 | Tsuneri | 364/519 X |
| 4,688,177 | 8/1987 | Agarwal | 364/200 |
| 4,691,295 | 9/1987 | Erwin et al. | 364/521 X |
| 4,742,447 | 5/1988 | Duvall et al. | 364/200 |
| 4,779,210 | 10/1988 | Katsura et al. | 364/518 X |
| 4,782,462 | 11/1988 | Kaplinsky et al. | 364/521 X |

FOREIGN PATENT DOCUMENTS 0153877 2/1985 European Pat. Off. .
WO83/03487 10/1983 World Int. Prop. O. .

OTHER PUBLICATIONS

Patent Abstracts of Japan, vol. 8, No. 219 (P-306)[1656], 5th Oct. 1984; & JP-A-59 100 976 (Fujitsu K.K.) 11-06-1984.
Patent Abstracts of Japan, vol. 9, No. 214 (P-384)[1937], 31st Aug. 1985; & JP-A-60 74 085 (Fujitsu K. K.) 26-04-85.
European Search Report, Application No. EP 88 30 7024 05-07-1989.

*Primary Examiner*—David L. Clark
*Attorney, Agent, or Firm*—Webb, Burden, Ziesenheim & Webb

[57] ABSTRACT

Disclosed is a page printing system which uses virtual (logical) memory for mapping images. Physical memory which is used for creating a page image bitmap for synthetic graphics is to be allocated as patches. A path in general corresponds to a rectangular area of a page when the page exists in bitmap form. Each patch is represented by a set of non-contiguous segments of logical memory which, when mapped to physical memory, are contiguous.

12 Claims, 8 Drawing Sheets

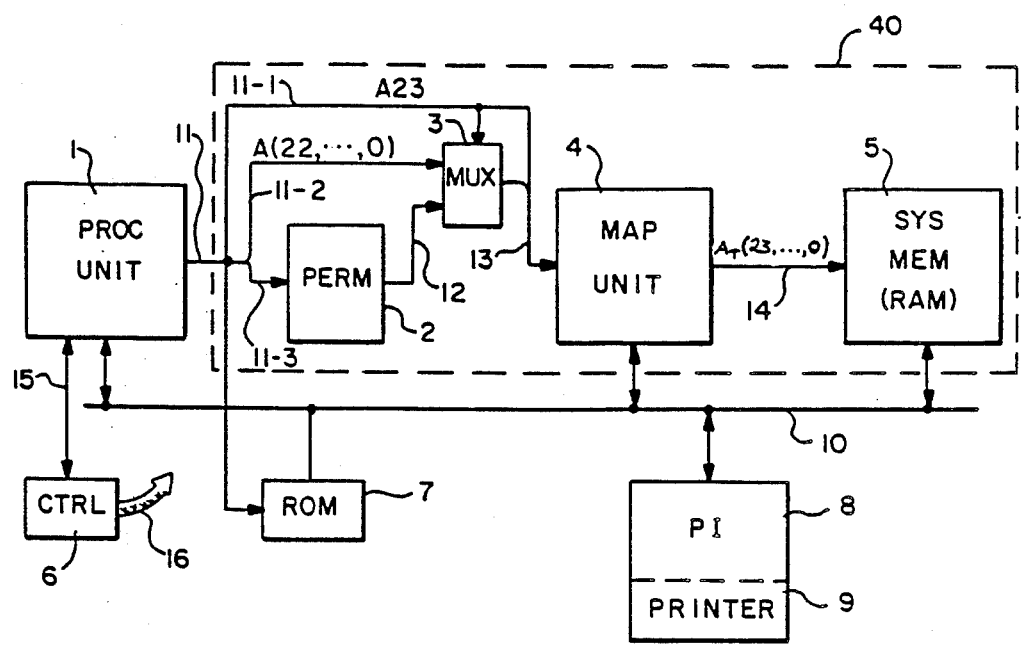
FIG.—1
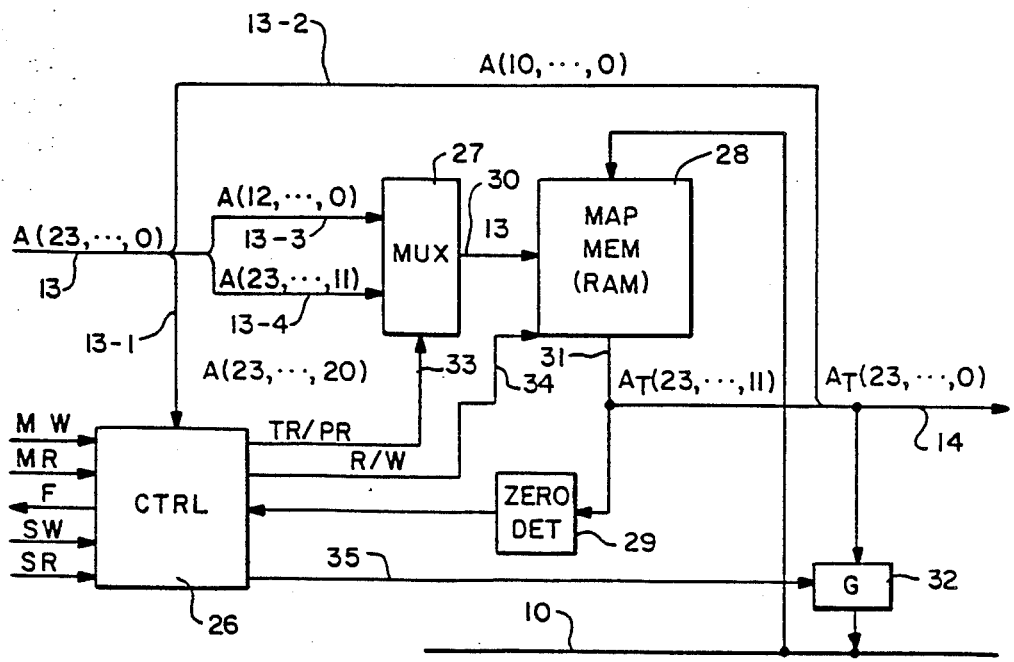
FIG.—2

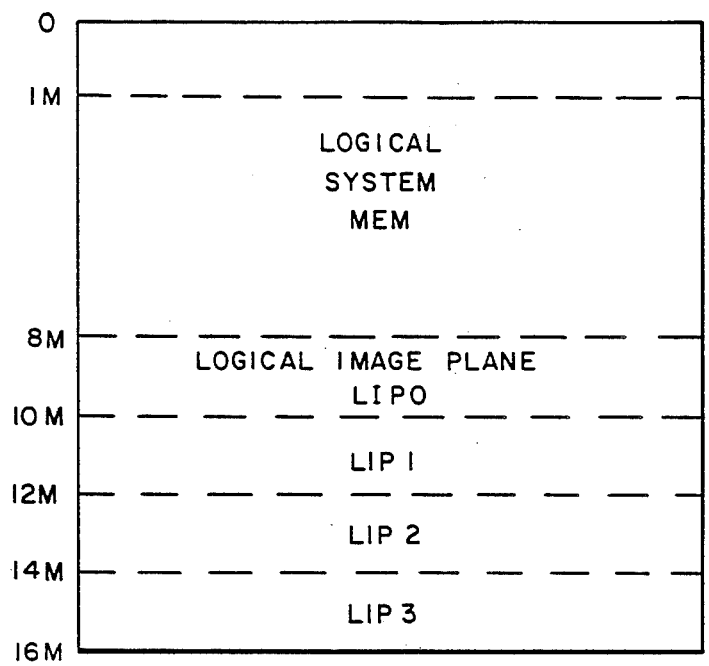
FIG.—3
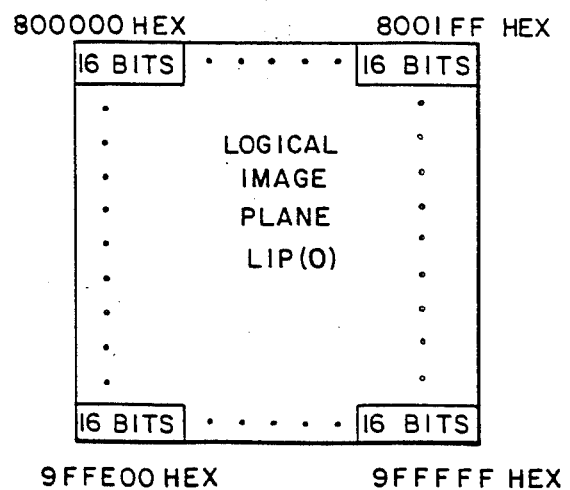
FIG.—4

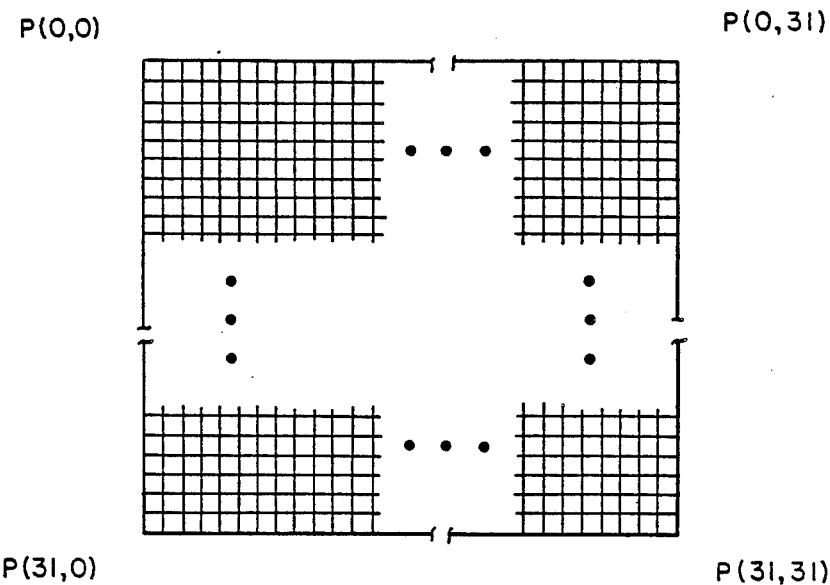
FIG. — 5
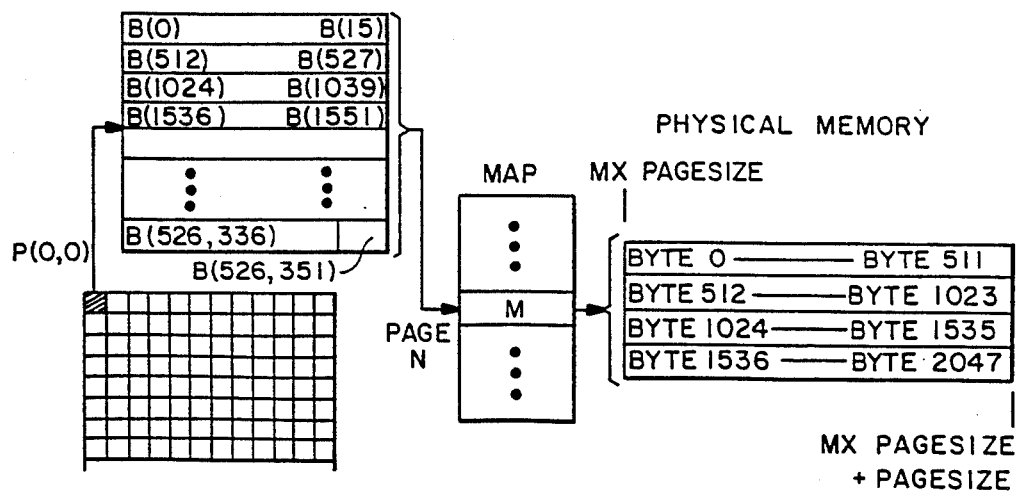
FIG. — 6

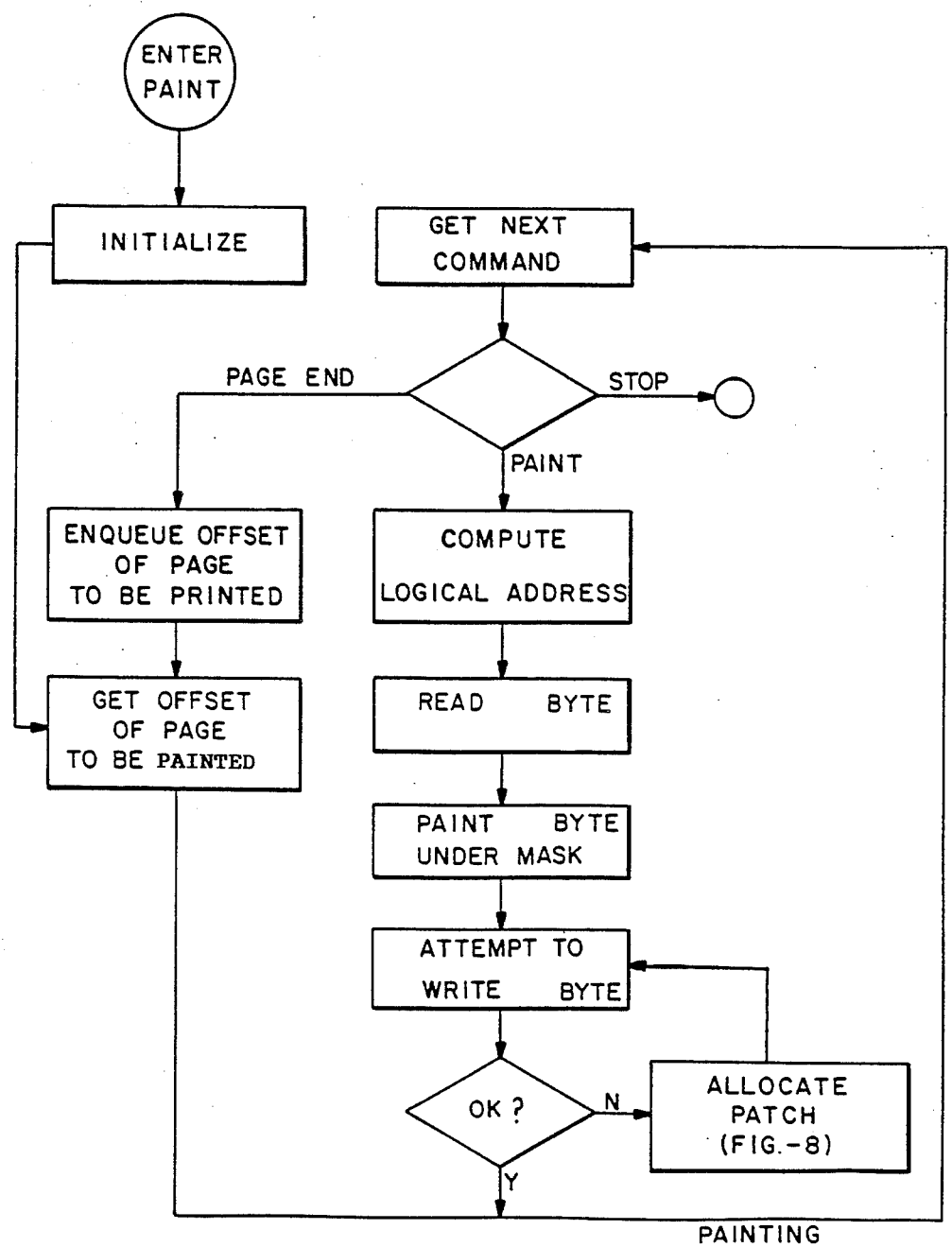
FIG.—7

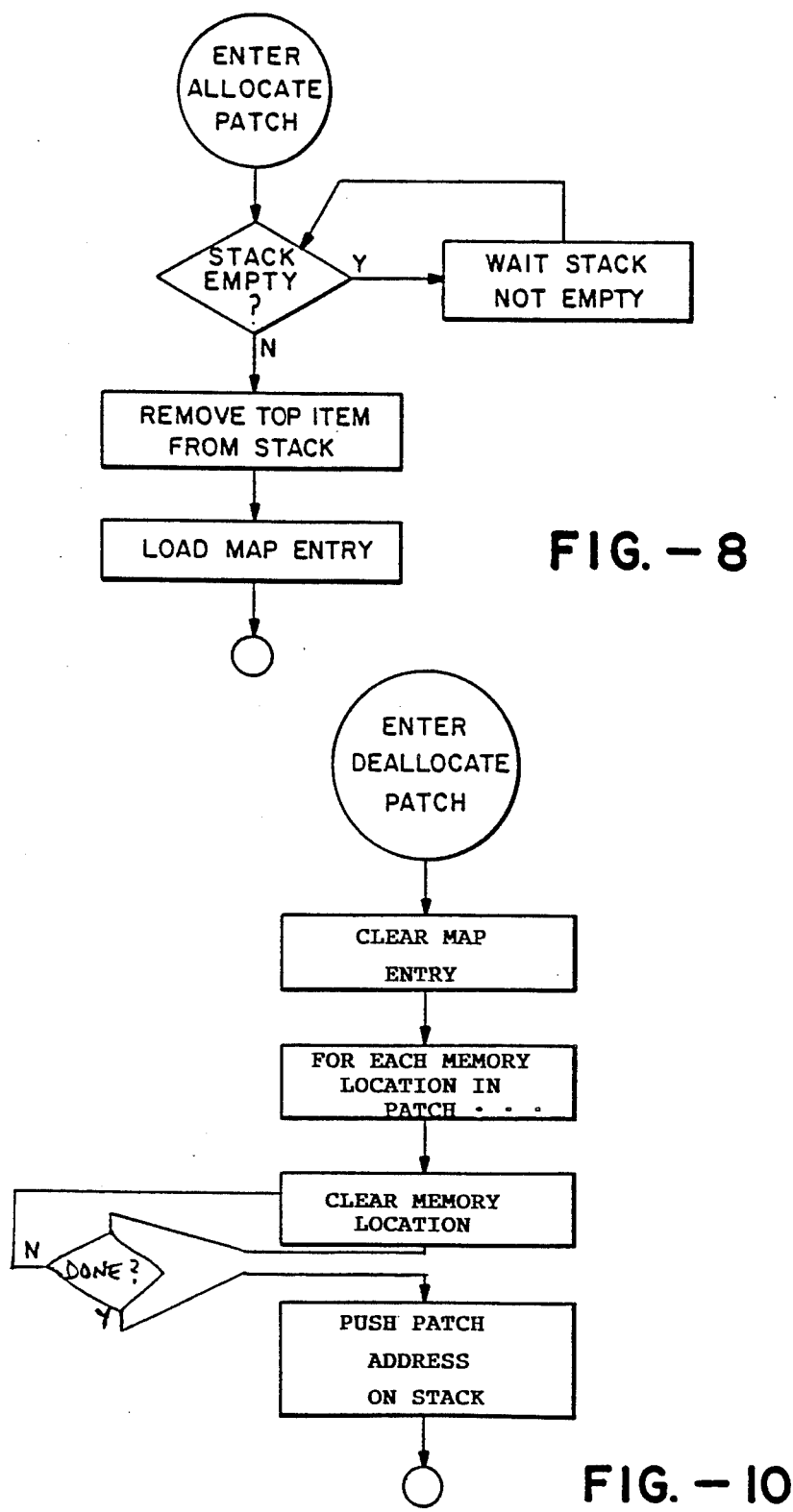
FIG.—8
FIG.—10

PATCHIFICATION SYSTEM

BACKGROUND OF THE INVENTION

The present invention relates to the field of page printing systems, and specifically to image processors for page printing systems.

Page printing systems are well-known and utilize many different types of printers. For example, xerographic drums, light emitting diode (LED), and laser printers (a xerographic drum coupled with a laser) are all commonly used to form page printing systems.

The page printing system processes encoded page layout information to form a printed page. An image processor processes the page layout information to form (paint) decoded and uncompressed page image data. The image processor operates during a processing time. A printer operating at a preestablished printing rate prints the printed page during a printing time. The printer forms a scanned array of variable intensity pixels in response to page image data. A printer interface connects the image processor to the printer so that the page image data is transferred to the printer (shipout) and determines the intensity of the printed pixels which form the printed page.

In page printing systems, a printed page is formed by printing discrete picture elements (pixels) at fixed physical locations on an output medium such as paper. In general, the picture elements have different colors, different intensities and possibly other variable parameters. In general, to define pixels with such variable parameters, each pixel is represented by n bits of data. In one simple example, the color is black and white and no other parameters are variable. In such a simple example, the pixel can be represented by a single bit ($n=1$) of data where the bit is "on" (binary 1) for black and "off" (binary 0) for white. When the printing device is a matrix printer with only black and white provided, the printed page is defined by a matrix of small locations which register either a printed pixel (black) or a blank spot (white) at the pixel location. In a typical black/white laser printer, each pixel is a square measuring 1/300 inch on a side. Each pixel is much smaller than the smallest character or other shape to be printed, and therefore, each character or shape is formed by a number of pixels.

The printer operates by scanning the output medium along one of its two axes. The paper moves parallel to a direction P called the pageward direction. The laser beam scans in a direction S called the scanward direction. The scanward direction is orthogonal to the pageward direction. The laser beam is either on or off at each pixel location thereby forming either a printed pixel or blank spot as the laser beam scans across the page. A full line in the scanward direction is called a scanline. A full page of scanlines results in the printed page.

In order for a printed page to be formed by the printer, data for turning the laser beam on and off is supplied to the printer. The data which represents the printed page and which is supplied to the printer is called a "page image" or page image data. The page image is stored in the memory locations of a computer or other storage device. In an example where pixels are black or white, one bit (representing a pixel) can be stored in one memory cell. For an uncompressed digital representation having a one-for-one mapping from page image to printed page, each bit of the digital representation which constitutes a page image must have a correspondence to a pixel in the printed page both as to pixel color (black or white) and location.

In one example, the printed page is represented as a sequence of 2640 scanlines, each scanline composed of 2040 pixels. Correspondingly, the page image can be stored in 2640 memory sections with each section having 2040 cells. For example, each memory cell stores one bit of information with the value "0" denoting a white pixel and the value "1" denoting a black pixel. Each memory section corresponds to one scanline of the printed page and hence there is a one for one bit to pixel map from bits in the memory cells of memory to pixels on the printed page.

An alternative representation for a page image is achieved by using run-length encoding of sequences of pixels of the same color. In run-length encoding, scanlines are represented as sequences, each sequence being defined of the form (length) (color), where length denotes the number of pixels and "color" is either "W" for white or "B" for black.

There are many other types of digital encoded representations which can be used to represent page images. Although there is a correlation between the page image data stored in memory and the pixels of a printed page, that correlation is not required to be a one for one bit to pixel map.

The page image data itself is usually decoded from a "page layout". A "page layout" is an encoded representation of an entire printed page. A page layout is encoded using a page layout language. The page layout language employs a library or table of basic shapes called "glyphs". Glyphs include letters, numbers, symbols and characters or shapes of all types and sizes. The page layout language encompasses instructions which define where glyphs are to be located on a printed page. Additionally, the page layout language may specify other printing primitives (lines, splines, etc.) and define where these are to be located on a printed page. A page layout expressed in a page layout language is decoded to form page image data which correlates pixels to locations on a printed page.

An image processor is a device which accepts the high-level encoded page layout data stored in digital form and processes the page layout to form decoded page image data, also in digital form. The page image data is then transmitted to the printer to cause the printer to form the printed page.

Image processors face a number of limitations when used with page synchronous printers. Page synchronous printers print at a uniform rate during the printing of a page and permit stopping of the printer only between pages. In some prior art devices, image processors have been designed to process the encoded page layout data to generate the decoded page image data at a rate which can match the constant data rate required by such printers. Complex page layouts, however, can upset the balance between processing the page layout and printing the page image. If the image processor is too slow in supplying the page image data to the printer, then an incorrect page will be printed since page synchronous printers do not permit the stopping of the printing of a page at any point between the beginning and the end.

Early prior art devices used variations of a partial-page memory buffer storage scheme. A partial-page memory buffer is a dedicated memory area in which only a portion of an uncompressed page image is stored. Since memory devices were relatively expensive and page layouts were relatively simple, early image processing systems took advantage of processing speed to save memory.

One partial-page memory buffer scheme was implemented in a prior art image processor using alternating buffers. With alternating buffers, the page layout information is processed to fill one buffer with digital representations constituting a first part of the page image. After the first buffer is filled with a part of the page image, that first buffer is emptied to the page synchronous printer for printing the printed page, while the first buffer is being emptied to the printer, the second buffer is being filled by processing of the page layout to form the next portion of the page. After the first buffer is emptied and the second buffer is filled, the roles of the two buffers are exchanged. The second buffer is emptied to the printer while the first buffer is again filled. The process of alternately filling and emptying the buffers continues until the entire page image is printed.

A second variation of a partial-page memory buffer scheme was implemented in a prior art image processor utilizing a band memory allocation method. This method consists of using a dedicated memory area, typically on the order of 128 kilobytes. The memory composing the band is organized as a number of scanlines, each having a common width of the number of pixels contained in the horizontal line of the page image. the band is commonly referred to as a window, as it never contains more than a relatively small number of scanlines of the page image.

System operation employing the band allocation method consists of filling the band (painting) with the contents of the first few lines of the page image, starting the page synchronous printer, and updating each line of the band as the prior contents are printed. In this manner the band is scrolled down the page image, effectively racing the page-synchronous printer to keep new data flowing into the band. The painting operation is limited to be within the band. Since the band scrolls over the page image, the painting order is constrained to the band as scrolled.

Partial-page memory buffer systems like the ones previously described are commonly used in text-only systems or systems which have relatively simple graphics accompanying the text. At the time of their inception, the performance of these systems was commensurate with the state of development of graphics and text applications software.

As previously stated, prior art systems employing partial-page memory buffer schemes face the processing problem presented by "locally" complex page layouts. If the buffer-fill rate is not fast enough to process locally complex page layouts at any time during the processing, the page image data will not be available at the time it is needed by the printer, resulting in an error in the printed page.

Locally complex page layouts are characterized by a complexity which requires a great deal of processing time to form some part of the page image. Complexity typically arises in a situation where a large number of glyphs and/or other printing primitives are to be located in a relatively small area of the printed page. When many instructions (steps in the page layout) are required to be executed in order to form some local portion of the page image, then the image processor may produce the page image at a slower rate than the rate at which the printer prints. In prior art devices of the type described, the slower rate encountered when processing complex page layouts results in an error condition called an underrun error.

A subsequent major development in prior art was the introduction of a solitary full-page image buffer. This type of prior art requires that the uncompressed page image for the entire printed page be processed and stored in a full-page buffer before the printing operation commences. The full bitmap memory allocation method (full-page buffer) is, as its name implies, a dedicated memory area which contains the number of pixel locations required to contain a full bitmap of an image of a document.

Solitary full-page buffer systems, while solving the previous problem of underrun errors, face a different problem. These systems have an inter-page delay problem when multiple printed pages are to be printed in rapid succession. The inter-page delay results from the fact that the system cannot start filling the solitary full-page buffer with the page image data of the next page until it has finished using its current contents to print the current page. The inter-page delay causes the overall printing speed for many printed pages to be greatly reduced. Accordingly, it is desirable to avoid the inter-page delay in page printing systems.

The prior art devices have been unsuccessful in solving both the local complexity problem and the inter-page delay problem without resorting to the use of double full-page buffers within the same system. Full-bitmap memory allocation was made feasible by a decrease of the high cost of high density memory devices. A typical array for an 8.5×11 inch page at 300 dots per inch is on the order of one megabyte of memory. Accordingly, double full-page buffering involves an array on the order of two megabytes.

Virtual memory techniques are well-known in data processing systems. Virtual memory address space is typically employed as a method of working around constraints imposed by cost, space, or architecture. The logical memory can exceed the physical memory or vice-versa. In the prior art, the defined logical address space is implemented by some real address space and the need for translation from logical to real always exists.

A well-known algorithm for subdividing an image employs the Greek recursive method of subdividing the image into smaller and smaller regions. The regions have multiple pixels in both the x and y directions. The algorithm starts with an N-by-M pixel image. The algorithm first determines whether the entire N-by-M image can be represented as a single-color (for example, black or white rectangle) representation. If not, the N-by-M image is subdivided into N/x-by-M/y representations, where N/x and M/y are integers. Thereafter, each of these representations is examined to determine whether or not it can be represented as a single-color image. If not, each subdivision is further subdivided and examined. An (x * y) array tree formation is formed where the depth of each branch may vary in the structure. The treeing continues until finally each leaf of the tree (representing a subimage) can be expressed as a single-color representation. The treeing may continue all the way down to the pixel level. In such a system the patches (subimages of the image) can range all the way from the full N-by-M image all the way down to single pixels as a function of the particular image which is being represented.

A problem with the Greek recursive method is that the amount of cost and overhead required to practically implement such a system is believed to be prohibitive. It is probably simpler and less costly to implement a full-page memory buffering scheme.

In view of the above background, it is the objective of the present invention to provide an improved image processor and printing system which eliminates the risk of incurring underrun errors resulting from local complexity and reduces the inter-page delay problem while not using an excessive amount of physical memory.

SUMMARY OF THE INVENTION

The present invention is an image processor and page printing system having logical memory for mapping images and employing patchification. The system performs four processes which are (1) painting which creates and stores the page image data, (2) allocation which maps logical patchified addresses to physical memory addresses, (3) shipping which transmits the page image data to the printer, and (4) deallocation which returns physical patches to a queue after printing.

In accordance with the present invention, logical memory within the page printing system is correlated (mapped) to physical memory for the purpose of storing and retrieving page image data by utilizing a patchification process. The patchification process employs a unit of page image data known as a logical patch. Each logical patch represents a subdivision, such as a rectangle or square, of a whole page image.

The logical memory address space is used to store one or more page images. The logical memory address space is partitioned into a number of logical patches.

A logical patch is a series of logical memory addresses in the logical address space which can be mapped one-to-one to a series of physical memory addresses defining physical memory locations in the physical memory. When the series of logical memory addresses is mapped to a series of physical memory addresses, the series of physical memory addresses is called a physical patch. Accordingly, there is a mapping of a logical patch in the logical address space to a physical patch in the physical address space. In general, more than one logical patch can be mapped to a given physical patch (for example, many blank logical patches are mapped to one blank physical patch). In general, two or more logical memory addresses (from different logical patches) can be mapped to the same physical memory address.

In a patch, the ordering of pixels is described relative to the scan order in which pixels are sent to a printer. Typically, the printer scan order is a raster scan order in which scanlines are ordered from top to bottom for a page and pixels within a scanline are ordered from left to right. After scanning the last pixel in one scanline (rightmost pixel), the next pixel in the raster scan is the first pixel (leftmost) in the next scan line.

Scan orders in which the order of selecting every pixel is identical to the printer scan order (such as raster scan order) are defined to be contiguous. If, however, the scan order skips pixels which would be selected in the printer scan order, but the selection order is otherwise the same, the scan order is defined to be non-contiguous.

In a patch, pixels are organized in segments where a number of segments represent an entire patch. The pixels within a segment of a logical patch (for example, a row of pixels in a logical patch) are contiguous relative to raster scan ordering; but, the last (rightmost) pixel of a given segment of a logical patch and the first (leftmost) pixel of the next segment of this logical patch are not contiguous since pixels are omitted between segments relative to the raster scan order.

The present invention employs patchification to obtain (1) improved locality of memory allocation, (2) physical memory savings, (3) reduction in memory cycling during shipout, and (4) a reduction in computations for locating arbitrary points in memory.

With the use of patchification, physical memory is allocated to specific areas of a bitmap image where it has the highest probability of being used by successive memory accesses which result in the placing of bits (also referred to as dots and pixels) within an image grid so as to create an image of a page within the grid.

A feature of the present invention is that the amount of high level page layout data used to generate the image to be painted is not constrained. Not only is the amount of input data not constrained, the order in which the input data is presented is arbitrary and no particular sort order is required. Of course, the order in which data is presented as controlled by the page layout may have an effect on the appearance of the image which is printed; for example, if it is desired that an image appear on top of an image which is on the bottom, then the bottom image should be presented first and the top image should be presented last. However, no sorting of the page image into bands from the top of the image to the bottom is required, as in all partial-bitmap and some full-bitmap systems. The presentation order of the input data does not impact the virtualization of the image data.

Also, if the image is an M-by-N image, the present invention supports a full M-by-N storage so that each pixel can be independently painted (that is, so that any M-by-N page image can be represented). The present invention permits repainting over the same pixel locations so that a local complexity of any amount is possible.

In the present invention, the allocation of physical memory is based only upon the quantity of physical memory required to print the actual image. For example, blank space bounded by a patch does not cost any memory to represent (other than in the map).

The present invention has a mapping of many addresses in the logical input data to possibly fewer physical locations in the physical memory. The mapping from the physical locations to the printed page is possibly many to one, and exists as an inverse correlation to the mapping of the input data. For example, whole logical patches which are blank are mapped to a single blank physical patch. During printing, the blank physical patch is mapped back to the blank areas of the logical page image.

The present invention paints into a logical memory and employs a system for physical patch allocation on demand. In this case, there exists an allocation (or mapping) table which indicates whether or not a physical patch has been allocated in the physical memory. A physical patch in physical memory maps to none, one or more logical patches of logical memory. Typically, a logical patch has both x and y dimensions. It is desirable to tailor the size and shape of a logical patch such that the logical patches conveniently subdivide a page image whereby pixels to be painted tend to be located in certain patches leaving other patches blank. A good logical patch size for a 300 dots per inch system is 128×128 bits. A rectangular shape for typical printed material is frequently optimum since printed material has x and y dimensions which are fairly localized rather than extending a long way in one direction (such as across the entire page image).

Patches of a fixed size are desirable since patches of variable size require overhead to keep track of where branches are and the length of each branch. Such overhead is likely to be more than just for a full bitmap memory. Moreover, fetching pixels to be printed from a memory system employing variable size patches may be difficult to accomplish within the bounded time limit required to avoid underrun errors. Of course, different types of patch shapes which are preselected can be employed. Typically, only one size patch will be employed in a single system.

The present invention overcomes printing errors and reduces inter-page delay, both associated with prior art, by separating the painting and printing processes into independent, asynchronous processes. The painting process paints each page image, then enqueues the completed page image for printing. The printing process prints each page from the queue of completed page images. By employing multiple logical page image memory spaces and sufficient physical memory, a fast painter can paint page images of typical complexity faster than the printer can print them, thereby eliminating inter-page delay. For locally complex page images which take longer to paint than to print, the printing process can continue to print page images from the queue of completed pages. If the queue becomes empty, the printing process can stop the printer at a page boundary until a completed page image becomes available for printing (thereby reintroducing inter-page delay). In this manner, the performance degrading effect of local complexity is averaged over several page printing times.

The inter-page delay which results from a series of complex documents is less with the present invention than with prior art devices. The reduction in inter-page delay results from the use of logical memory coupled with the use of patches. The unconstrained painting order of the current invention lessens the amount of time that either of the two processes (painting and printing) has to wait on the other, because the operation of the two processes are overlapped.

It is apparent from the above summary that the present invention achieves the objective of providing an improved page printing system which employs logical memory and patchification for image processing.

Additional objects and features of the present invention will appear from the following description in which the preferred embodiments of the invention have been set forth in detail in conjunction with the drawings.

BRIEF DESCRIPTION OF THE DRAWINGS

FIG. 1 depicts an overall block diagram of a page printing system in accordance with the present invention.

FIG. 2 depicts a schematic block diagram of the mapper unit which forms part of the FIG. 1 system.

FIG. 3 depicts a schematic representation of the memory space which is addressable within the FIG. 1 system.

FIG. 4 depicts a schematic representation of an image plane which forms part of the address space of FIG. 3.

FIG. 5 depicts a schematic representation of the address space for a single patch within the FIG. 3 image plane.

FIG. 6 depicts a schematic representation of a mapping example.

FIG. 7 depicts a flow diagram representative of the operation of the FIG. 1 system for the painting process which stores information into the memory of the FIG. 1 system.

FIG. 8 depicts a flow diagram representing the allocation process which is used in connection with the painting process of FIG. 5.

FIG. 10 depicts the deallocation process which is employed within the printing process of FIG. 7.

DETAILED DESCRIPTION

General

Figure 9:
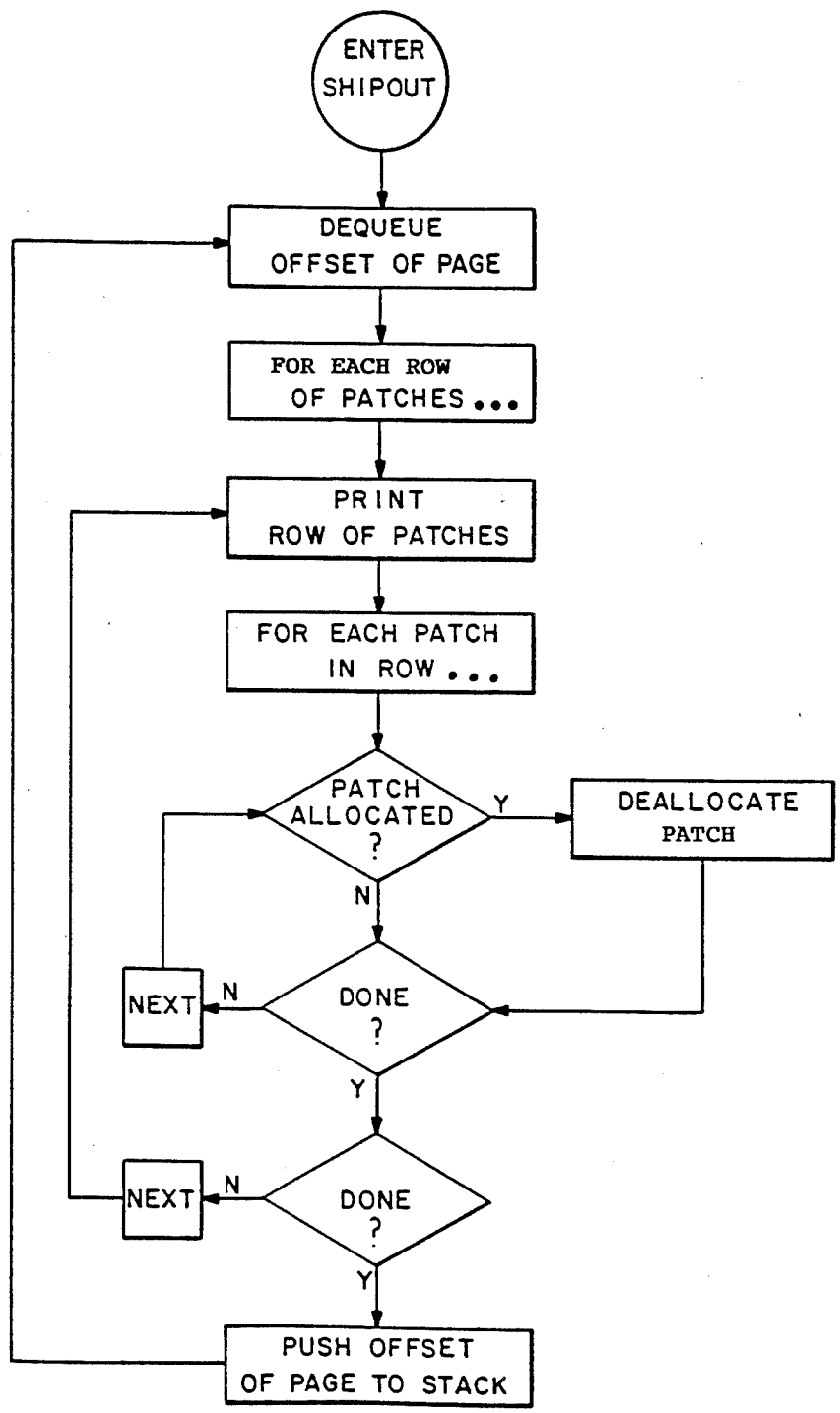
FIG. 9 depicts a flow diagram representing the printing process in which data to be printed is shipped out from the memory of the FIG. 1 system to the printer.

The present invention employs patchification to obtain (1) improved locality of memory allocation, (2) physical memory savings, (3) reduction in memory cycling during shipout, and (4) a reduction in computations for locating arbitrary points in memory.

With the use of the patchification, physical memory is allocated to specific areas of a bitmap image where it has the highest probability of being used by successive memory accesses which result in the placing of bits (also referred to as dots and pixels) within an image grid so as to create an image of a page within the grid.

Allocation utilizing patchification follows the normal predictability of the process which paints an object in the synthetic graphics bitmap. An object of arbitrary x and y dimensions is normally painted in a raster format from left to right and from top to bottom from a given starting position. Additionally, individual pixels which compose a synthetic graphics image normally exist in clusters. Placing a pixel within a previously blank patch results in the physical memory allocation of the entire patch for subsequent memory access operations, thereby allocating memory in anticipation of its being used immediately.

The patchification memory allocation method improves the efficiency of allocation by assigning physical memory only where it is needed.

Patchification saves physical memory by allocating physical memory only to those patches within a page image that contain pixels which are different from the pixels contained in a blank patch. The resultant savings are on the order of one-third of the memory that is required to produce a full bitmap for test pages with normal margins. Additional physical memory savings may be realized when the page image contains blank areas created by indented paragraphs or areas surrounding stand alone graphics objects.

In the worst examples, patchification consumes no more physical memory than a full bitmap. Worst examples are ones in which each patch of the page image contains pixels which are different from the pixels contained in a blank patch.

Systems employing patchification can realize a reduction in memory cycling during shipout. Shipout is the process of transmitting the document image data from memory to a printer. Since all of the data fields of a blank patch contain identical data, a simple register storing the blank data can be substituted for all memory accesses to blank patches. The reduction in memory cycling realized can be approximately one-third of the total memory cycles required for shipout of a page in a system not employing patchification.

Systems employing the patchification memory allocation method can realize a reduction in arithmetic computations required to locate an arbitrary point in the bitplane memory. The reduction is the result of using logical memory to create image plane widths which are an integer power of two, rather than some number which is a modulus of a smaller power of two (used in systems not employing patchification to minimize physical memory requirements). The result is that a pixel address can be partitioned into two independent fields, one representing the location of the scanline within the page and the other representing the location of the pixel within the scanline.

The present invention is compatible with existing architectures for (1) physical memory reclamation and recycling and (2) sharing of a common system memory map.

With patchification, physical memory can be reclaimed during the shipout process. The raster method in which shipout accesses memory periodically frees patches of memory, which can be used to create a subsequent page (paint ahead) or allocated to other functions of the printing system. Since each patch may be placed anywhere within the logical image plane (bitmap), the painting of subsequent page images is bounded only by the number of free patches available and is not constrained to the position of the patch being freed as it would be if physical and not logical memory were used.

The map needed to implement patchification can be shared with the map needed to implement other software processes in a logical memory system. The requirement for such sharing is that the number of addresses used by each logical and each physical patch must be equal to the number of addresses used by other allocatable units of memory within the system (commonly referred to as memory pages). By sharing the map, all logical processes can allocate physical memory from a common queue.

The implementation scheme for patchification can be represented as a multi-plane composition and, more specifically, is logically described as three planes for a page image composed of contrasting black and white pixels. Two of these planes exist in the logical domain and one in the physical domain.

The first or top plane is represented by a logical page image memory organized as a rectangular matrix of addresses which is addressed by a central processing unit (CPU) to store and to retrieve page image data. The second or middle plane is represented by a second logical page image memory array, which is in effect a shadow memory of the first and which functions as a translator to translate the addresses from the top memory array into addresses required for the implementation of patchification. The third or bottom plane is represented by a mapped physical memory, which receives addresses from the second logical memory array and which causes the page image data supplied by a processing device to be stored in or retrieved from physical memory.

The memory array representing the top plane is referred to as a pure logical page image memory, the memory array representing the middle plane as a patchified logical page image memory, and the physical memory representing the bottom plane is referred to as physical memory or mapped physical memory.

The pure logical page image memory has x and y dimensions which correspond to the width and length, respectively, of the printed page. The granularity within the memory of the area defined by the x and y dimensions is the equivalent of the printed pixel. The value of the x dimension is constrained to an integer power of two and is greater than or equal to the number of pixels required by the printer in the scanward direction. The value of the y dimension is not constrained to a power of two, but is also greater than or equal to the number of scan lines required by the printer for a complete page image.

The pure logical page image memory occupies a contiguous set of logical addresses throughout its entirety. Each address accesses a predetermined and constant quantity of pixels in the x direction, typically determined by the number of bits contained in the data bus (data bus width) of the CPU within the system in which patchification is employed. An address which accesses the first pixel, which is the area representing the upper-most and left-most corner of the pure logical page image memory array, is referred to as a relative zero address. Addresses increase to access pixels from a left direction towards a right direction. Pixels are grouped in quantities which are a modulus of the data bus width (data bus pixel quantity), whereby successive adjacent quantities of pixels to the right of the first pixel are accessed by addresses which are successive single increments of the zero relative address. The address of a pixel which is adjacent to the first pixel in the pageward direction is determined by adding to the first pixel address the value of the number of addresses which determine the entire x dimension of the memory array. Consecutive adjacent pixels in the pageward direction are determined as addresses which are a modulus of the number of addresses which determine the x dimension of the memory array.

The patchified logical page image memory is created without the use of additional logical memory space. It is, as previously stated, a shadow memory of the overlying pure logical page image memory. It is created by a constant permutation of the pure logical page image memory addresses which has the effect of creating logical patch boundaries in the shadow memory. The boundaries of the patches are determined to be quantities of pixels in the x and y directions, referred to as x-patch and y-patch quantities, respectively. The first pixel within a patch is the upper-most and left-most pixel within the boundaries of the patch. Relative to the first pixel, each modulus of the x-patch quantity marks the boundary of a unique patch in the scanward direction, and each y-patch quantity marks the boundary of a unique patch in the pageward direction.

A second mechanism within the patchified logical page image memory creates a correlation such that the addresses contained within the boundaries of a patch, a grouping of non-contiguous sets of linear addresses, can be mapped in a contiguous linear segment of physical memory. This correlation is also the result of the aforementioned constant permutation of the pure logical address. The resultant mapping is one for one to the pure logical page image memory and creates corresponding output addresses which are linear throughout the area bounded by a patch.

Within the patchified logical page image memory the first address within the area bounded by a patch is referred to as the first patch address. The first patch address is the address which accesses the upper-most and left-most data bus pixel quantity within the area bounded by a patch. Relative to the first patch address, the addresses of each successive data bus pixel quantity contained within the first linear segment within a patch increases by a single increment from left to right for each modulus of the data bus pixel quantity contained within the patch until the scanward boundary of the patch is encountered. The left-most address of the second linear segment within the patch is determined by adding to the first patch address the total number of addresses which determine the x dimension of the logical page image memory. The process continues for determining the addresses of the third and successive linear segments until both the scanward and the pageward boundaries of the patch are simultaneously encountered.

Each logical patch has a unique identifying number which is extracted from the portion of the address output of the patchified logical page image memory (patchified, or permuted address). The subfield within the patchified address, the patch identifier, is the portion of the output address which specifies a modulus of the common size of the linear physical patch within the system employing patchification. The patch identifier is the portion of the address which is used as an input to a mapping table. The output of the mapping table is used to specify a physical patch corresponding to a unique patch identifier.

Addresses within the boundaries of a logical patch map one-to-one to addresses within a corresponding physical patch. The first address of the logical patch maps to the first address of the linear physical patch. Maintaining the one for one correlation, the addresses of both memories increase by a single increment for each modulus of the data bus pixel quantity until the scanward boundary of the patch is encountered. The left-most address of the second linear set of addresses of the patch maps to the linear physical address which is increased by a single increment from the address corresponding to the right-most address of the first set of linear addresses within the patch. Again, the addresses of both memories increase by a single increment for each modulus of the data bus pixel quantity until the scanward boundary of the patch is again encountered. The process continues until both the scanward and the pageward boundaries of the patch are simultaneously encountered.

During operation there are four major processes which function to implement the logical memory page image storage and retrieval system utilizing patchification. These processes are (1) painting, or creating and storing the page image data, (2) mapping of logical patchified addresses to physical memory addresses (allocation), (3) shipping, or transmitting the page image data to the printer, and (4) returning physical patches to a queue after printing (deallocation). During the painting process, the CPU accesses the pure logical page image memory as an x-y raster memory buffer to store the page image data. The underlying process of allocating physical patches is accomplished on demand and only for those logical patches which are non-blank. The shipping process causes a completed page image to be printed from an ordered queue of page images. Deallocation occurs as the result of a patch of page image data having been printed, eliminating the need for retaining the page image data contained within the patch.

Prior to starting the painting process for a page image, the entire memory bounded by the pure logical page image memory is mapped from the patchified logical page image memory to the physical memory. The mapping corresponds to a blank page image in that each blank logical patch is mapped to a common physical patch which contains page image data representing a blank page. The resulting mapping is such that logical access to an uncompressed blank page image is accomplished entirely by a single physical patch. All other physical patches which are reserved for the process of storing page image data are pre-initialized to a common condition representing blank page image data and have their corresponding physical location numbers stored in an unordered queue (stack) of available physical patches.

The painting process acts in response to a set of page layout instructions, each of which instructs the CPU to create a portion of the uncompressed page image at a location within the bounds of the pure logical page image memory which corresponds to the actual page image. If the processor attempts to change the content of any pixel at any address within the pure logical page image memory which has an area bounded by a patch in the patchified logical page image memory, and the target patch is mapped to the common blank physical patch, there exists a condition known as a patch fault. The patch fault causes physical memory to be allocated from a queue of unordered physical patches to the target logical patch such that non-blank page image data can be stored from the pure logical page image memory address to the allocated physical patch. Upon completion of allocation of the patch, any additional CPU accesses to an address in the pure logical page image memory which is bounded by the same patch in the patchified logical page image memory do not cause additional patch faults, as the allocation process maps the entire area within the logical patch to a physical patch which is different from the common blank physical patch.

The painting process continues during the creation of a page image until one of two conditions exists: (1) either the page image is completed, or (2) there exists both a patch fault and no available physical patches to be mapped to the target logical patch. If the page image is completed, the completed page image is queued for printing. If the page image is not completed, a delay exists in the painting process until a segment of physical memory is made available to be mapped to the target patch. The desired physical memory is retrieved from an unordered queue of physical patches after being released (deallocated) during the printing of a previously queued completed page image, whereby the deallocated physical patch was previously mapped to a logical patch of the previous page image.

The deallocation process deallocates and returns to the unordered queue physical patches during the shipping of a page image. During the shipout process, the raster method of addressing the pure logical page image memory periodically causes all of the addresses within the boundary of a patch to have been accessed and the corresponding physical page image data to have been retrieved and printed. The contents of the physical patch which corresponds to the target logical patch, after being printed, is restored to a condition whereby the contents of the physical patch represents a blank page image. The physical patch has its reference to the corresponding logical patch removed from the map table and the location of the physical patch is returned to the unordered queue of available physical patches. The logical patch is remapped to the common blank physical patch in preparation for creating a subsequent page image.

Overall System—FIG. 1

In FIG. 1, a computer system which operates in accordance with the present invention is shown. The computer system includes a processing unit 1 having a data bus 10, an address bus 11 and control lines 15. Processor 1, in one embodiment, is a Motorola TM 68010 microprocessor. The processing unit using address bus 11 has an address, in the present example, of 24 bits, namely, the address bits $A(23, 22, \ldots, 1,0)$ representing an address space of 16 megabytes (16M). The address bus includes a high order bit A(23) which connects on line 11-1 to control a multiplexor (MUX) 3. One input to the multiplexor 3 is the address bus 11-2 including the address bits $A(22, 21, \ldots, 0)$. The address bus 11-3 includes the address bits $A(15, 14, \ldots, 4)$ which are input to a permuter 2 which transforms the address bits to provide the transformed address bits on output bus 12. Multiplexor 3, in one preferred example, also receives the address bits $A(20, \ldots, 16)$ and the address bits $A(3, \ldots, 0)$ which are combined with the permuted address bits on bus 12. The address bits selected by the MUX 3 together with the A(23) address bit on line 11-1 are combined onto the bus 13 as an input to the map unit 4. The map unit 4 performs a logical address (as input on bus 13) to real address transform (as output on bus 14). The address on bus 14 is the mapped address $A_T(23, 22, \ldots, 0)$. The mapped address on bus 14 addresses the system memory 5. System memory 5, when addressed by the address on bus 14, provides a data output onto bus 10.

The printer interface 8 connects to the data bus 10 for receiving data to be printed by the printer 9.

Also connected to the data bus 10 is a read only memory (ROM) 7 which is addressed as part of the address space of address bus 11 from the processing unit The ROM 7 returns data to the data bus 10 when addressed by the processing unit 1. The system of FIG. 1 also includes a control unit 6 which controls the various operations of the units of FIG. 1 with decoded commands from the processing unit 1. The processes generally controlled by the control 6 are a system memory read (SR), system memory write (SW), map read (MR), map write (MW), printer interface read (PIR), printer interface write (PIW). The control unit 6 also receives a flag, F, and provides interrupts to the processing unit 1.

The FIG. 1 system is a logical memory system in which the addresses for the system memory 5, the ROM 7 and the other memory units are logical addresses. Those logical addresses, as they appear on bus 11 from the processing unit 1 before addressing physical memories such as the system memory 5, are translated from logical addresses to real addresses by the map unit 4.

The system of FIG. 1 operates in two modes, one mode which utilizes a logical image plane for controlling the images that are to be printed by the printer 9. During the logical image plane operation, high-level commands specify the image to be printed, the painting of the images into the logical image plane, and the shipout of the painted image data from the data memory to the printer interface 8 for printing in the printer 9.

The FIG. 1 system also operates as a conventional processing unit with logical addressing of the logical system memory. The logical system memory (used for conventional computing processes) and the logical image plane (used for controlling the formation of the image to be printed) all share the same addressing facilities. Accordingly, the logical image plane is integrated with the logical system memory within the FIG. 1 system to form a single logical memory system.

Map Unit—FIG. 2

In FIG. 2, further details of the map unit 4 of FIG. 1 are shown. The map unit receives the 24-bit input address on address bus 13 and provides a 24-bit mapped address $A_T(23, \ldots, 0)$ on output bus 14. For reading or writing maps, the information on output bus 14 is gated via gate 32 to the data bus 10.

In FIG. 2, the input address bus 13 has a subbus 13-2 including address bits $A(10, \ldots, 0)$ which connects from the input bus 13 directly to the output bus 14 without modification. The input bus 13 also has a subbus 13-3 including the address bits $A(12, \ldots, 0)$ and a subbus 13-4 including the address bits $A(23, \ldots, 11)$. Each of the subbusses 13-3 and 13-4 are connected to the multiplexor 27 which selects between either bus 13-3 or bus 13-4. Multiplexor (MUX) 27 is controlled by the control line 33 from the control 26. The bus 13-4 is selected by multiplexor 27 whenever the logical address on bus 13 is to be logically remapped by the map memory 28. The bus 13-3 is selected whenever the map memory 28 is to be addressed for reading or writing map data from a location in the map memory 28.

The control 26 receives on bus 13-1 the address bits $A(23, \ldots, 20)$ which are used for determining which one of the bus 13-3 or the bus 13-4 is to be selected. If all of the address bits $A(23, \ldots, 20)$ are 0's, then the control 26 selects the bus 13-3, and when not all 0's the bus 13-4 is selected. Control 26 receives the MW, the MR, the SW, the SR signals from the control 6 for specifying the MapWrite, MapRead, SystemWrite and SystemRead operations. Control 26 also provides the flag signal, F, back to the control 6. The flag control signal on line 26 is generated whenever the zero detect unit 29 detects that the output on bus 31 from the map memory 28 is all 0's. The control 26 also generates standard read, write and other control signals for controlling the random access memory (RAM) on lines 34. Control 26 also generates the gate control signal on line 35 which causes the output from bus 14 to be gated to bus 10 under the all 0's condition of the address bits $A(23, \ldots, 20)$ and MW or MR is active.

The memory system of FIG. 1 supports logical memory operations, which include mapping, allocating physical memory on demand, and segmenting of software and hardware processes. The system is capable of functioning with different sizes of physical memory within the 16M logical address space.

An optional mask generator (not shown) may be added as a system component to improve system performance by sharing with the processor 1 the task of painting the bitmap image. This component may be a custom component or a commercially available general purpose graphics integrated circuit capable of translating high level commands into components of the page image bitmap.

The system memory unit 40 provides for dynamic memory cycling, demand allocation of physical memory, and the processor support required to implement the unit of memory referred to as the physical patch.

The map is used in the present invention to correlate physical memory to logical memory in predetermined block sizes, called physical patches. The physical patch sizes may vary for each system implementation, as system size and performance dictates. Ideally, the map is capable of mapping the entire logical addressing range of the processor 1. Two common methods of implementing a map are with static RAM and With a dynamic random access memory DRAM.

The MUX 27 within the map unit of FIG. 2 selects either the least significant 13 bits on bus 13-3 or the most significant 13 bits of the address bus on bus 13-4 as an input to the map RAM memory.

The addressing range of the processor 1 is subdivided into spaces. The resulting spaces are assigned to physical pieces of the system. The memory space from 0 to 1M addresses ROM 7, System Register Memory (not shown), and MAP unit 4 Memory.

In this memory space logical equals physical. There is no reason to map this area because it represents fixed pieces of the system. The addresses are decoded (as opposed to mapped) from the processor's address bus.

The memory space from 1M through 8M-1 (100000 HEX through 7FFFFF HEX) is the Logical System Memory. This memory space of the system represents seven megabytes of the processor's addressing range. The system maps this area to real (physical) memory in blocks of two kilobytes.

The memory space from 8M through 16M-1 (800000 HEX through FFFFFF HEX) is for Logical Image Memory. This area of the system represents eight megabytes of the processor's addressing range. The system maps this area to real physical memory in blocks of two kilobytes.

A good way to distinguish between the use of the upper 13 bits or the lower 13 bits of the address bus within the map is to show how the entire address bus is used to either access memory (upper 13 bits to map) or the map itself (lower 13 bits to the map). Starting with a logical memory access and working backwards to a map access assists in understanding the need for the address MUX within the map.

In FIG. 2, a physical RAM address is obtained from the processor logical address for access to system memory when the upper four bits, A(23, 22, 21, 20), are first decoded to determine that the processor is accessing system memory The address is then divided into upper and lower portions. The lower 11 bits, A(10, . . . , 0) are isolated and preserved, as these bits represent the offset within the 2K byte physical patch that is being mapped. The upper thirteen bits, A(23, . . . , 11) representing the number of the 2K byte logical patch of logical memory, is passed to the map to access an offset within the map. The output of the map (13 bits) is recombined with the preserved 11 bits, A(10, . . . , 0) of the original logical address to form a single address to access physical memory. When accessing the map in this manner, the offsets are a modulus 2K within the processor's entire address space.

In FIG. 2, the processor address is used to access the contents of the map RAM (for programming or for verification) when the upper four bits of the address are first decoded to determine that the processor is attempting to access the map itself, and not a memory location having its physical address partially derived from the map. This operation will place the contents of the offset within the map on the system data bus 10 so that the data can be analyzed by the processor. In the previous operation, the contents of the physical RAM memory was placed on the data bus for analysis by the processor. When accessing the map in this manner, the offsets are contiguous within the 16K byte area of the processor's address space.

In FIG. 2, the operation during a system memory access is different from the system's operation during a map access. The major differences between the two are the use of the map and the output of the "address space" decoder. In FIG. 2, when the processor is accessing RAM 28 to read or write map information, the control 26 renders the RAM select output active along with the gate 32. In FIG. 2, when the processor is accessing the map to perform a translation, the gate 32 is not activated and the map is used as a pointer to a physical patch of physical memory.

There are other methods that could be used to implement the map design without having to employ the MUX 27 within the memory unit 40. One method employs a control bit which discriminates between a map access and a memory access, thus allowing the map and the memory to be accessed with the same addresses. With the use of the control bit, the offsets within the map are calculated to be 2K addresses apart, as the map is accessed using the same upper thirteen bits of the processor's address that are used to access memory.

In FIG. 2, when the map memory 28 is accessed with a logical address for painting, an all 0's output is detected by the 0-detector 29 and causes the control 26 to send a flag, F, to the control 6 of FIG. 1. Control 6 of FIG. 1 interrupts the processing unit 1 and causes an allocation process in accordance with FIG. 8 to be performed.

During a shipout process, when the map memory 28 is addressed with a logical address and the 0-detector 29 detects an all 0 conditions, then the control 26 will inhibit the flag, F, to the control 6 of FIG. 1. The memory control 26 will cause physical memory 5 located at mapped physical patch zero to be accessed and the contents of physical patch zero (the blank physical patch corresponding to a blank logical patch) will be shipped to the printer.

A second method which can be used to implement shipout saves memory accesses when blank logical patches are addressed to retrieve page image data from the memory. In this manner, when the map memory 28 is addressed with a logical address and the 0-detector 29 detects an all 0 condition, then the control 26 will inhibit the flag, F, to the control 6 of FIG. The control 26 also causes the gate 32 to be enabled to gate the all zero condition out to the data bus 10 and in turn to the printer interface 8 of FIG. An all 0 condition is an indication that the particular logical address corresponds to a physical address which has not been allocated and, therefore, implicitly has been allocated to the common blank physical patch. The common physical patch is, in fact, the all 0's location from the map memory 2B. In this Way, whenever the common implicitly allocated physical patch is designated, no memory cycles to the system memory 5 of FIG. 1 need be wasted. The all 0's data is gated directly to the printer interface 8 of FIG.

without Waiting for memory cycles of the system memory 5.

Virtual Memory Space—FIG. 3

The logical memory space of FIG. 3 is, in one example, 16 megabytes (16M) in size and is defined by the 24 address bits, A(23, 22, ..., 1, 0) on the address bus 11 from the Processor 1 of FIG. 1. The high-order address bit A(23) divides the logical address space into two parts, namely the logical system memory (LS)$^w$ from 0 through 8 -1 when A(23) is 0 and the logical image plane (LIP) from 8M through (16M-1) when A(23) is 1. The logical image plane is divided into four logical image planes, LIP0, LIP1, LIP2, and LIP3 containing the blocks 8M-(10M-1), 10M-(12M-1), 12M-(14M-1), and 14M-(16M-1), respectively, designated by the values 00, 01, 10, and 11 of the address bits A(22, 21) provided that A(23) is 1.

Whenever the four high-order address bits A(23, 22, 21, 20) are all 0's, the address is defined to be in the one megabyte of address space within the logical system memory between 0 and (1M-1) and, in this address space, the logical addresses are the same as real (physical) addresses.

Logical Memory Image Plane—FIG. 4

FIG. 4 depicts the Logical Image Plane 0 (LIP0) of FIG. 3 and is typical of the four image planes LIP0, LIP1, LIP2 and LIP3 of FIG. 3.

A logical image plane is defined to be a set of logical (virtual) addresses organized into a table or representation of an x-y coordinate grid. Coordinates on the grid are located by the formula: logical address=Ny+x, where N=the width of the plane (where N can be measured in bits, bytes, words, or any other unit) and where the base of the plane is assumed to be at address 0.

A patch is defined to be a rectangular region of logical memory which, when mapped to physical memory, occupies a contiguous or linear set of addresses.

A logical image plane is utilized as a logical surface upon which a bitmap raster image of a page is created. The LIP0 plane of FIG. 4 is composed of a square grid of 4096 bits, assumes a starting logical hex address of 800000 and a data bus width of 16 bits (note that this starting address is conveniently the beginning (8M) of the upper half (8M-16M-1) of the address space of FIG. 3. The four corners of the plane are bounded by hex byte addresses 800000 (upper left corner, 801FFF (upper right corner), 9FFE00 (lower left corner and 9FFFFF (lower right corner).

The width and height of the plane of FIG. 4 were selected for three reasons: (1) any point in the plane is easily located as an offset in both the x and y directions since the plane has a bit width (4,096) which is both a power of two ($2^{12}$) and an integer multiple of the number of bits (16) in the data bus, (2) the plane must be large enough to contain an 8.5 by 11 inch document image at 300 dots per inch, and (3) the width and height of the plane must each be integer multiples of the common width and height, respectively, of the individual patch matrix (32-by-32 patches) that will be used to subdivide the plane.

A second example of a logical image plane (not shown) is composed of a rectangular matrix of 32,768 (32K) bit horizontally by 512 bits vertically, the optimal width and height to contain an image for a 17 inch wide sheet of roll paper at 1,200 dots per inch or a 13 inch wide sheet at 2,500 dots per inch, typical sizes and densities of electronic typesetters. A 17 inch sheet of paper at 1,200 dots per inch consumes a maximum of 20,400 bits per line and 32K is the closest power of two that will contain the page width. The minimum height of the logical image plane must be sufficient to satisfy the engine requirements and also be an integer multiple of the height of a patch. In this example, the engine is assumed to be a band (or swath) synchronous device, which permits the page image to be both created and shipped in pieces, and is assumed to be compatible with the given memory arrangement.

Both examples utilize the same size logical image plane of 2 megabytes. These examples are but two of the ways in which a logical image plane can be configured to facilitate the utilization of patchification. The size of the plane actually used for each implementation will ultimately be determined by the size of the page image that will be created, the common size of the individual patch, and the number (four in the FIG. 3 example) of image planes that are desired or that can exist in the logical memory range of the processor.

Logical Address Transform—FIG. 5

FIG. 5 depicts the logical image plane of FIG. 4 organized into the 32 rows of patches {P(0,0), P(0,31)}; ...; {P(1,0), ..., P(1,31)}; {P(31,0), ..., P(31, 31)} so that a 32-by-32 row and column matrix of patches is formed. The patches are created by transforming the logical addresses. This transformation is accomplished by identifying and labelling bit fields within the logical address which make up individual patches and the collection of patches (the patch matrix) that make up the logical image plane.

An example will be give to explain how the logical address transform permits the patchification of the 4096 by 4096 bit logical image plane of FIG. 4 into a 32-by-32 array of patches in FIG. 5, with each patch consisting of an array of 128-by-128 bits. The 32-by-32 array of patches in FIG. 5 will completely tile the logical image plane of FIG. 4.

The address transform required to create the predetermined matrix of FIG. 5 is performed on the 23-bit logical address A(22, 21, ..., 0). The logical address is subdivided into four major components: (1) the image plane row (Y5) which is the row location of the patch within the 32-by-32 array of patches; (2) the patch row (Y7) which is one of the 128 available rows in a patch; (3) the image plane column (X5) which is the column location of the patch within the 32-by-32 array of patches forming the logical image plane; and (4) the patch column (X4) which is the column location of the 16-bit data field within the patch. The patch row (Y7) is swapped with the image plane column (X5) field to obtain the proper patch addresses for the bytes that form a patch.

A description of the logical address fields and the manner in which they are translated is given in connection with the following TABLE 1 through TABLE 5.

In TABLE 1, the BYTE address X9 is represented by the logical address bits A(8, ..., 0) which represents the 512 (32 by 16) bytes that appear in each row of the logical image plane. The ROW address Y12 represents the 4,096 (32by 128) rows of bytes that occur in a logical image plane as represented by the logical address bits A(20, ..., 9). The address bits A(22, 21) define the four different logical image planes. The address bit A(23)

distinguishes between the logical image plane and the logical system memory.

In TABLE 2, the X9 address field is broken into an X5 address field for the address bits A(8, ..., 4) and X4 for the address bits A(3, ..., 0).

Similarly, the Y12 field is broken into the Y5 field for the address bits A(20, ..., 16) and the Y7 field for the address bits A(15, ..., 9).

In TABLE 3, the patchification transform occurs by reversing the order in TABLE 2 of the X5 and Y7 fields. In this manner, the Y5 field represents the image plane row (IP-ROW), the X5 field represents the image plane column (IP-COL), the Y7 field represents the patch row (P-ROW) and the X4 field represents the patch column (p-COL).

In TABLE 4, a specific example of a logical address is shown corresponding to the logical address for the painting instruction $I_1$ in TABLE 8.

In TABLE 5, the transformed address resulting from transforming the logical address of TABLE 4 is shown.

The interpretation of the fields in TABLES 1 through 5 is as follows. The four least significant X4 address bits A(3, ..., 0) binarily represent sixteen bytes (8 bit data fields) that make up the 128 columns within each patch. The next X5 group of five bits A(8, ..., 4) binarily represent the 32 columns of patches within the logical image plane. The next Y7 group of seven bits A(15, 9) binarily represent the 128 internal rows of each patch. The next Y5 group of five bits A(20, ..., 16) binarily represent the 32 rows of patches within the logical image plane. The remaining PA group of two bits A(22, 21) binarily represent the logical image planes and the bit A(23) is a bit that identifies the logical image plane of the logical system memory.

OPERATION

The painting and printing processes share common logical memory as described in connection with FIG. 3 and common physical image memory, stored in system memory 5 of FIG. 1, within which images are painted and printed. The logical space is subdivided into R logical patches and the physical address space is divided into S physical patches, each of which can store data representing an M×N array of pixels. Each patch is characterized by a patch number from 0 to R-1 for logical patches and from 0 to S-1 for physical patches. In the embodiment described in connection with FIG. 5, M is equal to N and each is equal to 32. Typically, S is less than R.

The physical memory locations required for storing of patches are only allocated when needed. The patch numbers of unused patches of physical memory are stored in a stack of physical patch numbers located in system memory 5. When the painting process needs a physical patch, it obtains an available patch number from the stack and allocates the patch to a logical patch, by storing the patch number in an entry of the map in memory 28 of FIG. 2. When the printing process is finished using a physical patch, it deallocates the patch, returning its patch number to the stack of unused patch numbers. When a physical patch is allocated, the physical patch corresponds to a logical patch within the logical address space.

A stack is used to store the unused physical patch numbers because the collection of available and unused patch numbers can be unordered. That is, when the painting process requests the next unused patch number, the patch number assigned is immaterial.

The painting and printing processes share a logical address space, the logical image plane of FIG. 3, within which images are painted and printed. The logical address space is subdivided into PA regions called pages, each large enough to describe the image of a printed

TABLE 1

| S | PA | ROW | | BYTE | | BIT |
|---|---|---|---|---|---|---|
| A | A A | A A A A A A A A A A A | | A A A A A A A A | | A A A |
| 23 | 22 | 20 | 9 | 8 | 0 | |
| | | Y12 | | X9 | | |

TABLE 2

| S | PA | ROW | | | | BYTE | | | | BIT |
|---|---|---|---|---|---|---|---|---|---|---|
| A | A A | A A A A A | | A A A A A A A | | A A A A A | | A A A A | | A A A |
| 23 | 22 | 20 | 16 | 15 | 9 | 8 | 4 | 3 | 0 | |
| | | Y5 | | Y7 | | X5 | | X4 | | |

TABLE 3

| S | PA | IP-ROW | | IP-COL | | P-ROW | | P-COL | | BIT |
|---|---|---|---|---|---|---|---|---|---|---|
| A | A A | A A A A A | | A A A A A | | A A | A A A A A | | A A A A | A A A |
| 23 | 22 | 20 | 16 | 8 | 4 | 15 | 9 | 3 | 0 | |
| | | Y5 | | X5 | | Y7 | | X4 | | |

TABLE 4

| IP-ROW | P-ROW | IP-COL | P-COL |
|---|---|---|---|
| Y12 | | X9 | |
| Y5 | Y7 | X5 | X4 |
| 0 0 0 0 1 | 0 0 0 0 0 0 0 | 0 0 0 0 1 | 0 0 0 0 |

TABLE 5

| IP-ROW | IP-COL | P-ROW | P-COL |
|---|---|---|---|

TABLE 5-continued

| Y5 | X5 | Y7 | X4 |
|---|---|---|---|
| 0 0 0 0 1 | 0 0 0 0 1 | 0 0 0 0 0 0 0 | 0 0 0 0 | page. As described in connection with FIG. 3, pA is equal to 4. Each page is characterized by an offset, representing values of the page address bits A(22, 21), that points to the beginning of the particular page within the logical address space.

The system maintains a stack of unused page offsets (00, 01, 10, and 11) from which the painting process can obtain an offset it will use as the current painting offset number for painting the next page. When the painting process is done painting a page, it enqueues the offset on a queue of offset numbers representing pages to be printed. The printing process dequeues an offset from the queue of offset numbers whenever it is ready to start printing the next page. While printing a page, it maintains the offset as the current printing offset number. When the printing process is done printing a page, it puts the currently being used offset number back into the stack of unused offsets numbers.

A stack is used to store the collection of unused offsets because the collection can be treated as unordered. That is, it is immaterial which unused offset the painting process gets when it requests one. However, a queue is used to store the collection of offsets representing pages to be printed, so that the pages will be printed in the order in which they were painted.

In general, a painting command can affect multiple words, affect multiple patches, reference a mask to be painted, paint according to a specific texture, generate a resultant image as an arbitrary function of the existing image and the texture, and be limited to affect the portion of the image within a previously specified clipping region.

In general, multiple implicit patch types can be accommodated, such as all-white or all-black, as long as the following requirements are met. A map entry must be able to distinguish the patch types. If an implicit patch type is accessed for reading, data appropriate for that type must be provided. In order for the painting process to make use of implicit patch types other than all-white (the type to which all patches are initialized at the beginning of painting a page), it must explicitly change map entries rather than painting in the normal way, word by word. The system must therefore be aware that it is painting whole patches, and that the intended result can be described implicitly by type. In the example, a single type of implicit patch is used in which all pixels are "white".

The transform of the logical addresses by permuter 2 of FIG. 1 creates a logical patch which is then mapped to a physical patch by the map unit 4 of FIG. The logical memory is partitioned into logical image planes and the logical addresses are transformed to create the logical patches.

System operation is a combined operation of (1) interpretation, (2) painting, and (3) shipout. The system receives a stream of encoded data and through the interaction of these three processes, creates a printed page as an output.

Interpretation

The interpretation process intercepts the incoming bit stream, which represents a page as a series of high level commands, and creates a series of lower level or intermediate descriptions of actions to be taken by the painter. The descriptions of actions to be taken by the painter. The system interprets and implements many high level commands, which include drawing a line between two given points, creating a circle or an ellipse from a given point and radius or radii, filling a polygon with a given or predefined reference texture, or placing a character in a given position within a page image.

Painting

The painting process takes an intermediate description of the page (for example, the commands of TABLE 8) from the interpreter and creates the page image in memory which, when complete, will be shipped, or transmitted, to an engine (printer) in raster format. The painting process relies upon logical memory, the subsequent mapping of logical memory to physical memory and the patchification of logical memory.

Logical memory, as described in connection with FIG. 3, has a size determined exclusively by the addressing range of the processor and without regard to the size of the associated physical memory in system memory 5. The correlation of logical memory to physical memory is accomplished with a table in map unit 4. The map unit 4 allows blocks of physical memory to be reclaimed and to be reassigned to any new block of logical memory.

Logical memory for painting is allocated in a manner which permits the painter to view the allocated logical memory array as a sheet of paper having the same length and width as that of the final page and having a printing dot density the same as that of the printer employed. The allocated logical memory array is then subdivided into small logical areas, such as squares or rectangles, called patches, which collectively represent the sheet in a manner similar to a puzzle composed of identically shaped pieces. All logical patches, each having a separate and distinct address, are initially mapped to a single physical patch which is colored white or some other background color. A blank sheet is represented in the system by the normal set of logical patches, which are all assigned a common physical Patch, namely the one containing the background color.

The painting process, in creating the image, can be instructed to begin a graphical object or text object at any location in the image memory. Any logical patch which is required by the painter to contain information other than the background color will be allocated its own unique segment physical patch by the system; this physical patch replaces the background color for the particular logical patch. The painting and memory allocation processes can continue, even producing multiple page images, until all painting is complete or all available physical memory has been consumed.

Memory access during painting is commonly done in a unit larger than a single bit, such as a byte (8 bits), word (16 bits) or long word (32 bits). To accommodate the painting of objects that do not completely fill the bit field of the memory access, each memory access during painting employs a read-modify-write memory cycle. The read portion of this cycle is needed so that individual bits which should not be modified can be preserved and not overwritten during the write cycle.

Shipout

After the painting process has completed a page image or some portion of the image (permitted only if the printer is not page synchronous), the shipout process begins copying the page image from system memory 5 to the printer interface 8 of FIG. 1. Either by initializing an optional DMA channel or using direct data transfers, the CPU begins the shipout process. The processor 1 may poll the memory to determine the need for processor activity during shipout, or it may use an interrupt scheme. If DMA is used, system performance will be increased, as the processor can perform other functions while the DMA performs the shipout.

The shipout process accesses the logical memory patches from left to right and top to bottom in a raster format. After the bottom line of a patch has been shipped, it is considered to be a free patch and can be reclaimed and used for creating another page image (assuming that any image within the patch will not be used again, say for a second copy). Reclamation consists of physically re-mapping the logical patch back to its background color and erasing the previously painted image from the physical patch (as well as re-entering the physical patch number to a free-list). If the optional DMA is employed, the operation can be programmed to erase each bit of memory that it accesses during shipping, instead of having this done under processor control after shipping, thereby expediting the erasing process in preparation for another page image.

The three major components of patchification are the logical memory (including the image plane and the address transform), the logical to physical memory map, and the physical patch allocator and deallocator.

segment for each of the 128 separate pixel lines in a patch.

In FIG. 6, the logical image plane of FIG. 5 has the patch P(0,0) consisting of 128 rows of 16 bytes per row. Those bytes are numbered (0-relative) with the byte addresses B(0), ..., B(15) for the first row, B(512), ..., B(527) for the second row, and so forth up to B(526336), B(526351) for the final row. These byte addresses are logical addresses and are not contiguous. After being passed through the map in FIG. 6, the bytes become remapped in a contiguous section of physical memory from 0, 2,047.

The remapping from non-contiguous logical address space to contiguous physical addresses is explained in connection with FIG. 6. In FIG. 6, the addresses are hex and are not 0-relative. The first row of logical addresses for the patch P(0,0) for bytes B(0), ..., B(15) are (800000), ..., (80000F). The second row corresponding to B(512), B(527) have address (800200), ..., (80020F), respectively.

The address transforms permit the x-y grid of bytes contained in a patch to occupy a contiguous block of physical addresses when mapped. The following TABLE 6 depicts the patch logical addresses corresponding to FIG. 6.

TABLE 6

| | patch 1 (16 bytes) | | | | patch 2 |
|---|---|---|---|---|---|
| 800000 | 800001 | 800002 | | | |
| 80000E | 80000F | 800010 | 800011 | ... | |
| 800200 | 800201 | 800202 | | | |
| 80020E | 80020F | 800210 | 800211 | | |
| patch 1 128 lines | . . . | | | | |
| 80FE00 | 80FE01 | 80FE02 | | 80FE0E | 80FE0F | 80FE10 |
| 80FE11 810000 81000E | ... 810001 81000F | 810002 810010 | 810011 | | |

Mapping

Mapping is the system operation that is used to correlate or assign logical memory to physical memory and uses the RAM table 28 of FIG. 2. In order to keep the map to a manageable size, logical and physical memory are organized into blocks which are frequently called memory pages. The assignment of physical to logical addresses for each block (memory page) is set by each element in the map. The addresses within each block (memory page) occupy contiguous locations of memory in both the logical and physical domains.

An example of the manner in which the map serves to correlate logical to physical memory is as follows. Assuming a block size of 2 kilobytes, each four lines of a 4096 bit wide non-patchified logical image plane (logical page N) are correlated to physical memory (physical page M) by a different element within the map.

Referring to FIG. 6, one example shows the method used to map a patch from a logical memory image plane to physical memory. The example uses a 128 by 128 bit (128 by 16 byte) patch (2 kilobytes). The individual data bytes of the patch are referenced by 2 kilobytes of contiguous physical addresses, although the internal logical addresses of the patch correspond to 128 non-contiguous 16-byte linear segments of logical addresses, one A transformation of the logical addresses within FIG. 5 demonstrates that the mapped addresses are contiguous. The starting address (800000 HEX) in TABLE 6 transforms into the same patchified address (800000 HEX) which marks the beginning byte address of patch P(0,0). Transformed address 800010 HEX in patch P(0.1) becomes patchified address 800800 HEX, which is 2,048 bytes from the starting position and, therefore, is contained in a different 2 kilobyte block of non-contiguous memory relative to the starting address. In the vertical direction, the logical address 800200 HEX marks the beginning address of byte B(512) for the second line of the logical image plane. The logical address 800200 HEX is transformed to physical address 800010 HEX which is exactly 16 byte positions from the beginning of the patch and, therefore, is contained in the same 2 kilobyte block of contiguous memory as is byte B(0). In a similar manner, all of the other bytes in a patch are stored into contiguous physical memory.

Physical Memory Allocation and Deallocation

Physical memory allocation and deallocation processes are performed in connection with patchification. First the patch allocation process occurs, then the process is utilized to create a page image in memory, and thereafter deallocation permits memory to be reclaimed during the shipout process.

Patch Allocation

The patch allocation process involves assigning, or mapping, physical memory to patches located within a logical memory image plane. The process is selective, as only those patches that are used by the painter are allocated. Allocation is accomplished on demand, which may be defined as the first time that the painter attempts to write (paint) to an unallocated patch.

A logical memory image plane is cleared, or erased, prior to its being given to a painting process. A plane is characterized as being blank, like a blank sheet of paper, when each of the logical patches which comprise the plane is marked or labeled to indicate the blank condition. The label may consist of mapping each individual logical patch to a common physical patch, such that accessing the common physical patch also accesses the blank flag. A second method may use an additional tag bit within the map that indicates whether or not the patch is allocated. In either case, a patch which is indicated as blank is considered to be unallocated, even though the patch may be mapped to a common blank physical patch.

Figures 11, 12:
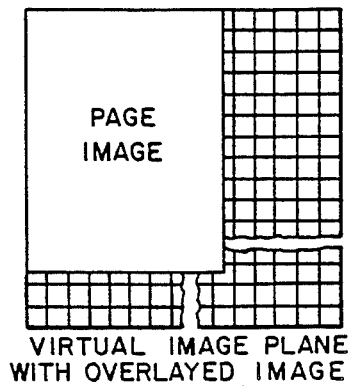
FIG. 11 depicts the relationship between the logical image plane and an overlayed page image.
FIG. 12 depicts a schematic representation of the patches in an image plane overlayed by one rectangular page image.

FIG. 5 depicts a patchified logical image plane, which has dimensions of 4,096 by 4,096 bits (2 megabytes) and is tiled with a 32-by-32 array of patches, each consisting of 128 by 128 bits. In FIG. 11, an 8.5 by 11 inch page image, at 300 dots per inch, is shown as an overlay on the patchified plane of FIG. 5 and, as shown, does not cover the entire plane. While the page image is shown against the left and top borders of the plane, it may be relocated to any position within the plane that allows the entire page image to be contained within the boundaries of the plane. The example image covers less than 20 patches in the horizontal direction and less than 26 patches in the vertical direction. However, since a patch is always allocated as a complete unit, the logical memory area that contains the page image is 20 patches horizontal times 26 patches vertical times 2 kilobytes per patch, which equals approximately 1 megabyte, which is half of the area of the logical memory image plane for one page.

FIG. 12 represents the 20 by 26 patch matrix that contains the page image in FIG. 11 with the image positioned in the upper left corner of the plane. Each of the patches in the patch matrix in FIG. 12 has a unique location number, which is shown in parentheses, and an allocation flag denoted by a second number beneath the location number. The location number is the (x-y) coordinate of the patch within the 20 by 26 matrix of patches that contain the page image. The zero beneath the location number in each of the patches indicates that each of these patches is mapped to a physical patch zero, which is a blank patch, indicating that the page image is blank.

TABLE 6 represents the manner in which the system addresses the array of patches of FIG. 12, assuming that hex address 800000 contains the first byte of the upper left corner of the page. The bold lines in the example represent the borders of the patches, with each patch containing 16 bytes along the x-axis and 128 pixel lines along the y-axis of the page image. The addresses inside the small rectangles are the linear logical image plane addresses that access the individual bytes. The beginning logical memory image plane address of each pixel line of the document image along the y-axis is exactly 4,096 bits from the beginning of the preceding line.

Patch allocation occurs as the result of patch faulting, which is the detection of a painting or write operation to an unallocated patch. An image will be painted using logical addresses and faults will occur as the transformed logical addresses indicates an access to an unmapped patch.

In the example, the logical address from the processing unit 1 of FIG. 1 is transformed into a patchified logical address by the permuter 2 and used to access the map unit 4. A flag within the map unit 4, specifically from the zero detector 29 of FIG. 2 signals that the access involves an unallocated patch. The controls determine whether the access is a painting operation and, if so, determines that a fault has occurred. The result of a patch fault during the painting process is that (1) the painting process will pause, (2) the targeted logical patch (whose access created the fault) will be allocated a patch of physical memory, and (3) the painting process will resume.

FIG. 12 shows the result of patch allocation when the outline of a rectangle is painted into the page image. The example assumes that a stack of physical patches numbered 1 through 14 are available to be allocated to the painting process. The top line of the rectangle begins in patch (2,2) and is painted horizontally through patch (7,2) with each patch that is painted being allocated physical memory in the sequence that it is accessed. The left vertical line of the rectangle is painted next, which results in patches (2,3) and (2,4) being allocated. The right vertical line of the rectangle is then painted, resulting in the physical memory allocation of patches (7,3) and (7,4). Finally, the base line of the rectangle is drawn, and patches (3,4), (4,4), (5,4) and (6,4) are allocated physical memory. All other patches remain mapped to the common blank patch zero, unless they are accessed by the painting process. If the rectangle is the only object in the image, then the 30K bytes contained in the 14 allocated patches and the common patch zero is the total physical memory required to represent the 1 megabyte bitmap for this 8.5 by 11 inch page image.

Physical Memory Deallocation

Physical memory deallocation is accomplished either during or after shipout, which is the process of transmitting a copy of the page image to a printer interface 8 of FIG. 1.

Memory may be reclaimed after the contents of a full row of patches is shipped to the engine. Using FIG. 12 as an example, the patches in the third row, which contain a portion of the outline of a rectangle, may be reclaimed and put back onto a stack of patches immediately after the shipout process has completed shipping the bottom line of each patch. These patches can be reclaimed as a group, rather than singly, when the bottom line of the right-most patch has been shipped. Once the last pixel line of the page image has been shipped, the entire logical memory image plane can be recycled for painting another page image.

Another benefit of shipout with patchification is that a reduction in memory cycling can be realized by not cycling memory for those accesses to unallocated patches, the patches within the page image that are blank. In one example, a shipout requests access to the memory by presenting a request signal and a logical memory plane address. The system will patchify and test the address through the map memory 28 of FIG. 2. If the address is found to be unallocated, the system will flag the shipout and send the data which represents an access to an unallocated patch to the printer interface 8. Since all unallocated data is uniformly blank, a memory access is not required to fetch blank data.

A detailed example of the operation of the present invention is given in connection with the following TABLE 7 and TABLE 8. TABLE 7 summarizes the parameters which describe the patches utilized in the example. TABLE 8 represents 12 commands I1, I2, ... , I12 which are processed by the system to paint the image of FIG. 13. The painting commands described in connection with TABLE 8 affect a single word, specified by a page-relative X-Y coordinate, and which paint black those pixels specified by a mask leaving the other pixels in the specified word unchanged. In general, the painting and printing processes execute concurrently. However, the printing process is relatively slow, so that if a painting event and a printing event are concurrent, the painting event is described as occurring first.

TABLE 7

|  | Typical |
|---|---|
| Pixels in X | 4,096 |
| Pixels in Y | 16,384 |
| Pixels per byte | 8 |
| Pixels per patch in X | 128 |
| Pixels per patch in Y | 128 |
| Patches in X (logical) | 32 |
| Patches in Y (logical) | 128 |
| Bytes in X | 512 |
| Bytes per patch in X | 16 |
| Address bits, Y (logical) (row) | 14 |
| Address bits, X (logical) (bytes) | 9 |
| Logical Patches | 4,096 (4 pages) |

TABLE 8

| I | C | X9(D) | Y12(D) | MASK | Patch row Y5 | Patch col. X5 |
|---|---|---|---|---|---|---|
| I1 | paint | 16 | 128 | 00111100 | 00001 | 00001 |
| I2 | paint | 16 | 129 | 00011100 | 00001 | 00001 |
| I3 | paint | 15 | 127 | 00001111 | 00000 | 00000 |
| I4 | newpage | | | | | |
| I5 | paint | 31 | 2 | 11100011 | 00000 | 00001 |
| I6 | newpage | | | | | |
| I7 | paint | 0 | 0 | 10000000 | 00000 | 00000 |
| I8 | paint | 16 | 0 | 10000000 | 00000 | 00001 |
| I9 | paint | 0 | 128 | 10000000 | 00001 | 00000 |
| I10 | paint | 16 | 128 | 10000000 | 00001 | 00001 |
| I11 | newpage | | | | | |
| I12 | stop | | | | | |

0. Initialize. The painting process is started. It performs system initialization as follows. The patch stack is initialized to contain the addresses of physical patches 1, 2, 3, and 4, in that order. The contents of each physical patch is initialized to white (zero). The unused logical page stack is initialized to contain logical address offsets 0 and 1, in that order. The queue of pages to be printed is initialized to be empty. The map is initialized to 0's, indicating that all of the entries point to physical patch zero.

The printing process is started. It attempts to dequeue the offset of the next page to be printed, finds that this queue is empty, and waits for an offset to be placed on the queue.

The painting process gets the next offset, 0, from the stack of offsets of unused pages and loads it into its current logical page offset register. (The stack now contains the only other such offset, 1.)

1. First Command I1. The painting process inputs the first command, paint (16, 128, 00111100). It computes the logical address of the word to be painted by adding the current offset pointer, to the page-relative address, 65,552. (The page-relative address is 512 times the Y coordinate plus the X coordinate, or 512*128+16=65,552.)

Logical byte 65,552 is read as follows. Logical address 65,552 (10000000000010000 binary) selects map entry 33 (100001 binary) (Bits 22, 21, 20, . . . 16, 8, 7, 6, 5, and 4 of the logical address constitute the map entry address.) The map entry shows that this logical patch is mapped to physical patch zero (not allocated) so a blank byte of data is returned from physical patch zero to the painter.

The painting process paints the word just read according to the command's mask, 00111100, and attempts to write it to logical address 65,552. The map indicates that no physical patch is allocated, so the painting process allocates a physical patch. i, from the stack of unallocated physical patches map entry 33 is set to indicate that a physical patch is allocated and that its address is 1. The Painted word, 00111100, is written into the physical location corresponding to logical address 65,552, which is physical address 2,048 (patch 0=physical address 0 through 2,047). (The physical memory address is 2,048 times the patch number plus a displacement derived from bits 15, 14, 13, 12, 11, 10, 9, 3, 2, 1, and 0 of the logical address.)

2. Second Command I2. The painting process inputs the next command paint (16, 129, 00011100). Page-relative address 66,064 is converted to logical address 66,064. Reading that location yields a word of zeroes, which are stored at physical address 2,560 (second line, first byte of physical patch 1). This word is painted according to mask 00011100, and the result is written back to logical address 66,064. In this case, the map indicates that the affected logical patch has an allocated physical patch, so no patch allocation is required.

3. Third Command I3. The painting process inputs the next command, paint (15, 127, 00001111). The logical address 65,039 (00111101 binary), corresponds to map entry 0. A word of zeroes is read from byte 511 of physical patch zero, and the mask is painted into address 65,039. When the result is written, map entry 0 indicates that no physical patch is allocated, so the painting process allocates the next physical patch, 2, and updates map entry 0 accordingly.

4. Fourth Command I4. The painting process inputs the next command, newpage. It enqueues the offset, 0, of a page to be printed and notifies the printing process. The printing process then dequeues this offset and begins printing the corresponding page. The painting process gets the next offset, 1, from the stack of unused offsets. (The stack is now empty.)

5. Fifth Command I5. The painting process inputs the next command, paint (31, 2, 11100011). The page relative logical address of the affected word is 1,055 (512*2 +31=1,055). The corresponding map entry 1,025 (second patch of second page), indicates no physical patch is allocated, so such a patch, 3, is allocated. The painted word is written at the corresponding physical memory location, 6,144 (3*2,048+31=6,144).

6. Sixth Command I6. The painting process inputs the next command, newpage. It enqueues the offset, 1, of the next page to be printed. (In this case, it is assumed that the printing process is still printing the first page, so it is not waiting for the next page to be enqueued and need not be notified of this occurrence.) The printing process attempts to get the offset of the next page to paint, but finds the stack of such offsets empty, so it is forced to wait until an offset is available.

The printing process, in printing the first page, prints the first row of logical patches. Logical patch 0 corresponds to physical patch 2, whose contents are printed explicitly. Moreover, as each word is printed, it is cleared so that when the physical patch is later deallocated it will contain all zeroes. Logical patch 1 has no corresponding physical patch, so zeroes (white) are printed for it (from the blank physical patch zero). After the first row of patches has been printed, physical patch 2 is deallocated and returned to the stack of available physical patches. The printing process then prints the second row of patches. Logical patch 32 has no corresponding physical patch, so zeroes are printed for it. Logical patch 33 corresponds to physical patch 1, whose contents are printed and cleared explicitly. After this row of patches has been printed, physical patch 1 is deallocated. Finally, after the entire page is printed, the printing process puts the offset, 0, for the page on the stack of unused offsets. Since the painting process is waiting for such an offset, it is notified. The painting process then gets the offset, 0, from the stack. The printing process dequeues the next offset, 2, from the queue of offsets of pages to be printed and starts printing that page.

7. Seventh Command I7. The painting process inputs the next command, paint (0, 0, 10000000) and paints the specified word, allocating physical patch 1 to logical patch 0 in the process.

8. Eighth Command I8. The painting process inputs the next command, paint (16, 0, 10000000) and paints the specified word, allocating physical patch 2 to logical patch 1 in the process.

9. Ninth Command I9. The painting process inputs the next command, paint (0,128, 10000000) and paints the specified word, allocating physical patch 4 to logical patch 32 in the process.

10. Tenth Command I10. The painting process inputs the next command, paint (16, 128, 10000000), and attempts to paint the specified word. A physical patch must be allocated, but none is available, so the process waits until a physical patch is deallocated from the page currently being printed before it continues.

11. Eleventh Command I11. The painting process inputs the next command, newpage. It enqueues the offset, 0, of the page it just painted to the queue of pages to be printed. It attempts to get a new offset for painting a next page, but finds the stack of unused offsets empty, so it waits.

Eventually, the printing process finishes printing the second page and puts its offset, 1, on the stack of unused offsets, and notifies the painting process.

12. Twelfth Command I12. The painting process inputs the next, and last, command, stop.

The printing process dequeues the next offset, 0, of a page to print, and starts to print it. After printing the first row of patches, it deallocates physical patches 1 and 2, and after printing the second row of patches, it deallocates physical patches 4 and 3. Then it puts the page offset, 0, on the stack of unused offsets. Then it attempts to dequeue the offset of the next page to print, but finds the queue empty, so it waits.

In the final state, the physical patch stack contains patches 3, 4, 2, and 1, in that order. The queue of offsets of pages to print is empty, and the printing process is waiting on it. The stack of unused offsets contains one offset, 0. The painting process, stopped by command, has offset 1. All map entries are cleared.

Figure 13:
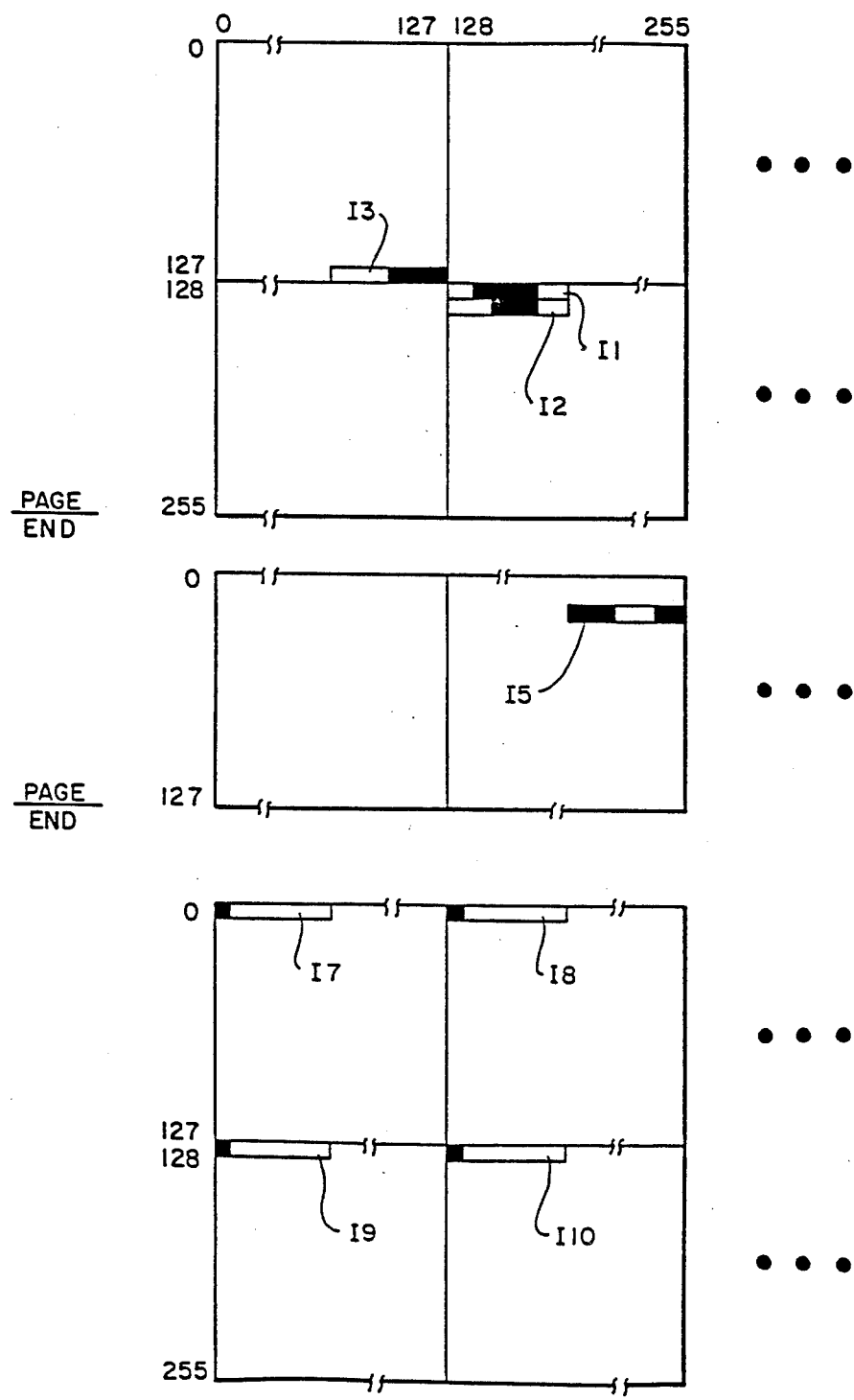
FIG. 13 depicts a schematic representation of one detailed example of page images overlayed on a number of patches over three page.

The portions of the images painted in connection with the commands of TABLE 8 appear in FIG. 13.

We claim:

1. A page printer processing system for receiving encoded layout data and painting a bit-mapped image stored in read/write physical memory in which each pixel can be independently painted and for shipping out the bit-mapped image to the printer to print a page, including decoding means for receiving the page layout data and converting it to bit-mapped image data, said physical memory storing data, including the bit-mapped page memory data, at random access physical addresses, means for assigning bit-mapped image data to logical addresses in logical memory, said logical memory divided into logical memory patches, means for mapping the addresses of logical memory patches to the addresses of physical memory patches so constructed and arranged that at least some logical patches containing identical bit-mapped data are mapped to at least one common patch in physical memory, said mapping means comprising a permuter means for transforming non-contiguous logical addresses to contiguous logical addresses within logical patches, and said mapping means making patches in physical memory other than said at least one common patch available for reuse as soon as the portion of the bit-mapped image stored therein has been shipped out and no further reference to that data is required by placing the addresses thereof upon a stack, and means for shipping out the bit-mapped image comprising means for supplying sequential logical addresses of logical patches to said mapping means and wherein said mapping means converts the logical addresses to real addresses of patches in physical memory.

2. The processing system according to claim 1 in which the mapping means further comprises means for translating the logical addresses associated with logical patches to contiguous physical addresses in said physical memory.

3. The processing system according to claim 1 in which the assigning means assigns the bit-mapped data to logical patches corresponding to small rectangular regions on the page to be printed.

4. The processing system according to claim 3 in which the assigning means assign the bit-mapped data to logical patches corresponding to a rectangular area on the page small enough to fit within the borders of the printed page.

5. The processing system according to claim 1 in which the assigning means assigns logical addresses between the starting addresses of each logical patch which are a power of two.

6. The processing system according to claim 1 in which the means for assigning, mapping and shipping out provide for the storing and retrieving of other system data in logical memory address space.

7. A page printer processing system for receiving encoded page layout data and painting a bit-mapped image stored in random access read/write physical memory in which each pixel can be independently printed and for shipping out the bit-mapped image to the printer to print a page, including decoding means for receiving the page layout data and converting it to bit-mapped image data, said physical memory storing data, including the bit-mapped page memory data, at random access physical addresses, means for assigning bit-mapped image data to logical addresses in logical memory, said logical memory divided into logical memory patches, means for mapping the addresses of logical memory patches to the addresses of physical memory patches so constructed and arranged that at least some logical patches containing identical bit-mapped data are mapped to at least one common patch in read/write physical memory associated with the mapping means and the remaining logical patches are mapped to the random access physical memory, said mapping means making patches in random access physical memory available for reuse as soon as the portion of the bit-mapped image stored therein has been shipped out, said mapping means further comprises a permuter means for transforming non-contiguous logical addresses to contiguous logical addresses within logical patches, and means for shipping out the bit-mapped image comprising means for sequentially supplying logical addresses of logical patches to said mapping means and wherein said mapping means converts the logical addresses to real addresses of patches in physical memory such that random access memory cycling is not required when data corresponding to the logical patches containing the identical bit-mapped data are being shipped out directly from the physical memory associated with the mapping means.

8. The processing system according to claim 7 in which the mapping further comprises means for translating the logical means associated with logical patches to contiguous physical addresses in said physical memory.

9. The processing system according to claim 7 in which the assigning means assigns the bit-mapped data to logical patches corresponding to small rectangular regions on the page to be printed.

10. The processing system according to claim 7 in which the assigning means assign the bit-mapped data to logical patches corresponding to a rectangular area on the page small enough to fit within the borders.

11. The processing system according to claim 7 in which the assigning means assigns logical addresses between the starting addresses of each logical patch which are a power of two.

12. The processing system according to claim 7 in which the means for assigning, mapping and shipping out provide for the storing and retrieving of other system data in logical memory address space.

* * * * *

UNITED STATES PATENT AND TRADEMARK OFFICE
CERTIFICATE OF CORRECTION

PATENT NO. : 4,942,541

DATED : July 17, 1990

INVENTOR(S) : Jeffrey H. Hoel, Eduardo D. Martinez and Jacobo Valdes

It is certified that error appears in the above-identified patent and that said Letters Patent is hereby corrected as shown below:

Abstract Line 4 "path" should read --patch--.

Column 3 Line 30 "the" should read --The--.

Column 8 Line 25 "page" should read --pages--.

Column 8 Line 39 "Within" should read --within--.

Column 10 Line 20 "scan lines" should read --scanlines--.

Column 13 Line 48 after "unit" insert --1.--.

Column 15 Line 15 "With" should read --with--.

Column 16 Line 56 after "FIG." insert --1.--.

Column 16 Line 59 after "FIG." insert --1.--.

UNITED STATES PATENT AND TRADEMARK OFFICE
CERTIFICATE OF CORRECTION

PATENT NO. : 4,942,541

DATED : July 17, 1990

INVENTOR(S) : Jeffrey H. Hoel, Eduardo D. Martinez and Jacobo Valdes

Page 2 of 5

It is certified that error appears in the above-identified patent and that said Letters Patent is hereby corrected as shown below:

Column 16 Line 64 "2B" should read --28--.

Column 16 Line 65 "Way" should read --way--.

Column 16 Line 68 after "FIG." insert --1--.

Column 17 Line 1 "Waiting" should read --waiting--.

Column 17 Line 8 "Processor" should read --processor--.

Column 17 Line 48 after "3" insert --)--.

Column 17 Line 49 after "left corner" insert --)--.

Column 18 Line 26 after "[P(0,0)," insert -- ...,--.

Column 18 Line 31 "Within" should read --within--.

Column 18 Line 36 "give" should read --given--.

UNITED STATES PATENT AND TRADEMARK OFFICE
CERTIFICATE OF CORRECTION

PATENT NO. : 4,942,541

DATED : July 17, 1990

INVENTOR(S) : Jeffrey H. Hoel, Eduardo D. Martinez and Jacobo Valdes

It is certified that error appears in the above-identified patent and that said Letters Patent is hereby corrected as shown below:

Column 19 Line 15 "(p" should read --(P--.

Column 19 Line 28 "A(15,9)" should read --A(15, ..., 9)--.

Column 21 Line 1 "pA" should read --PA--.

Column 21 Line 50 after "FIG." insert --1.--.

Column 21 Line 66 after "implements" insert
--many high level or intermediate descriptions of
actions to be taken by the painter. The system
interprets and implements--.

Column 22 Line 16 after "processor" insert --1--.

Column 22 Line 38 "Patch" should read --patch--.

UNITED STATES PATENT AND TRADEMARK OFFICE
CERTIFICATE OF CORRECTION

PATENT NO. : 4,942,541

DATED : July 17, 1990

INVENTOR(S) : Jeffrey H. Hoel, Eduardo D. Martinez and Jacobo Valdes

It is certified that error appears in the above-identified patent and that said Letters Patent is hereby corrected as shown below:

Column 24 Line 8 after "B(526336)," insert -- ...,--.

Column 24 Line 12 after "0," insert -- ...,--.

Column 24 Line 19 after "B(512)," insert -- ...,--.

Column 24 Line 50 "P(0.1)" should read --P(0,1)--.

Column 28 Line 2 after "pointer," insert --0,--.

Column 28 Line 18 "i" should read --1--.

Column 28 Line 19 "patches map" should read --patches. Map--.

Column 28 Line 21 "Painted" should read --painted--.

Column 29 Line 37 "(0,128," should read --(0, 128,--.

UNITED STATES PATENT AND TRADEMARK OFFICE
CERTIFICATE OF CORRECTION

PATENT NO. : 4,942,541

DATED : July 17, 1990

INVENTOR(S) : Jeffrey H. Hoel, Eduardo D. Martinez and Jacobo Valdes

It is certified that error appears in the above-identified patent and that said Letters Patent is hereby corrected as shown below:

Claim 1 Line 7 Column 30 after "encoded" insert --page--.

Claim 7 Line 66 Column 30 "printed" should read --painted--.

Signed and Sealed this

Thirty-first Day of March, 1992

Attest:

HARRY F. MANBECK, JR.

*Attesting Officer*      *Commissioner of Patents and Trademarks*